(12) United States Patent
Ito et al.

(10) Patent No.: US 7,881,550 B2
(45) Date of Patent: *Feb. 1, 2011

(54) VISUAL PROCESSING APPARATUS, VISUAL PROCESSING METHOD, PROGRAM, RECORDING MEDIUM, DISPLAY DEVICE, AND INTEGRATED CIRCUIT

(75) Inventors: Takeshi Ito, Osaka (JP); Haruo Yamashita, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/713,530

(22) Filed: Feb. 26, 2010

(65) Prior Publication Data

US 2010/0188523 A1 Jul. 29, 2010

Related U.S. Application Data

(63) Continuation of application No. 12/159,077, filed as application No. PCT/JP2007/057468 on Apr. 3, 2007.

(30) Foreign Application Priority Data

Apr. 28, 2006 (JP) .............................. 2006-125504

(51) Int. Cl.
G06K 9/40 (2006.01)
H04N 9/64 (2006.01)
H04N 9/00 (2006.01)

(52) U.S. Cl. ...................... 382/254; 382/266; 382/264; 348/622; 348/625

(58) Field of Classification Search ................ 382/165, 382/167, 190, 199, 219, 220, 250, 251–252, 382/255–256, 260–266; 348/607, 610, 615, 348/622, 625, 627; 358/3.26, 3.27, 532, 358/537, 540, 463, 464
See application file for complete search history.

(56) References Cited

U.S. PATENT DOCUMENTS 4,667,304 A * 5/1987 Hier et al. .................... 708/819

(Continued)

FOREIGN PATENT DOCUMENTS

EP 0 377 386 8/1995

(Continued)

OTHER PUBLICATIONS

Scognamiglio, G. Ramponi, G. Rizzi, A. Albani, L. ,"A Rational Unsharp Masking Method for TV Applications", Oct. 24-28, 1999, IEEE Image Processing, 1999. ICIP 99. Proceedings, pp. 247-251 vol. 4.*

(Continued)

*Primary Examiner*—Vu Le
*Assistant Examiner*—Andrae S Allison
(74) *Attorney, Agent, or Firm*—Wenderoth, Lind & Ponack, L.L.P.

(57) ABSTRACT

It is possible to inhibit side effects, even when an image that has sharp edge regions has been input, using a spatial processing portion (10) outputting surrounding image information US from an input image signal, a control signal generation portion (40) outputting an effect adjustment signal MOD according to a degree of flatness of an edge proximal region, and an effect adjustment portion (20) outputting a synthesized signal MUS that is synthesized by changing a ratio of the image signal IS and the surrounding image information US according to the effect adjustment signal MOD. Further, the side effects are inhibited using a visual processing portion (30) visually processing the image signal IS based on the synthesized signal MUS and the image signal IS.

10 Claims, 19 Drawing Sheets

U.S. PATENT DOCUMENTS

| | | | | |
|---|---|---|---|---|
| 5,012,333 | A | * | 4/1991 | Lee et al. ............... 358/520 |
| 5,038,388 | A | * | 8/1991 | Song .................... 382/266 |
| 5,050,223 | A | * | 9/1991 | Sumi .................... 382/266 |
| 5,454,044 | A | | 9/1995 | Nakajima |
| 5,555,031 | A | | 9/1996 | Van Rooij |
| 5,880,767 | A | * | 3/1999 | Liu ..................... 347/251 |
| 6,055,340 | A | | 4/2000 | Nagao ................... 382/261 |
| 6,169,823 | B1 | * | 1/2001 | Takeo et al. ............ 382/308 |
| 6,285,798 | B1 | * | 9/2001 | Lee ..................... 382/260 |
| 6,373,992 | B1 | * | 4/2002 | Nagao ................... 382/266 |
| 6,611,627 | B1 | * | 8/2003 | LaRossa et al. .......... 382/240 |
| 6,628,842 | B1 | * | 9/2003 | Nagao ................... 382/266 |
| 6,731,400 | B1 | | 5/2004 | Nakamura et al. |
| 6,735,330 | B1 | * | 5/2004 | Van Metter et al. ....... 382/132 |
| 6,847,377 | B2 | * | 1/2005 | Kitahara et al. ......... 345/600 |
| 6,965,416 | B2 | * | 11/2005 | Tsuchiya et al. ........ 348/606 |
| 7,130,483 | B2 | * | 10/2006 | Kim .................... 382/266 |
| 7,248,743 | B2 | | 7/2007 | Murakami |
| 7,333,673 | B2 | * | 2/2008 | Wang ................... 382/269 |
| 7,426,300 | B2 | | 9/2008 | Ohkawa |
| 7,433,536 | B2 | * | 10/2008 | Kim .................... 382/266 |
| 7,602,447 | B2 | * | 10/2009 | Arici et al. ........... 348/687 |
| 7,689,055 | B2 | * | 3/2010 | Zhang et al. ........... 382/254 |
| 2002/0047911 | A1 | * | 4/2002 | Tsuchiya et al. ........ 348/252 |
| 2002/0181024 | A1 | | 12/2002 | Morimoto et al. |
| 2004/0051789 | A1 | | 3/2004 | Horita |
| 2004/0051794 | A1 | | 3/2004 | Horita |
| 2004/0096103 | A1 | * | 5/2004 | Gallagher et al. ....... 382/167 |
| 2004/0175054 | A1 | | 9/2004 | Ogata et al. |
| 2004/0202377 | A1 | | 10/2004 | Murakami |
| 2004/0246537 | A1 | | 12/2004 | Ohyama et al. |
| 2005/0013484 | A1 | | 1/2005 | Ohkawa |
| 2005/0089239 | A1 | | 4/2005 | Brajovic |
| 2005/0094890 | A1 | * | 5/2005 | Wang ................... 382/266 |
| 2005/0104974 | A1 | | 5/2005 | Watanabe et al. |
| 2005/0207629 | A1 | | 9/2005 | Toyoda |
| 2007/0188623 | A1 | | 8/2007 | Yamashita et al. |

FOREIGN PATENT DOCUMENTS

| | | |
|---|---|---|
| EP | 1 404 120 | 3/2004 |
| GB | 2 170 373 | 7/1986 |
| JP | 62-143567 | 6/1987 |
| JP | 63-177662 | 7/1988 |
| JP | 63-182785 | 7/1988 |
| JP | 03-048980 | 3/1991 |
| JP | 4-152788 | 5/1992 |
| JP | 06-046295 | 2/1994 |
| JP | 07-135667 | 5/1995 |
| JP | 7-177530 | 7/1995 |
| JP | 10-191054 | 7/1998 |
| JP | 10-208034 | 8/1998 |
| JP | 2000-149014 | 5/2000 |
| JP | 2001-5960 | 1/2001 |
| JP | 2001-275015 | 10/2001 |
| JP | 2002-83294 | 3/2002 |
| JP | 2002-281313 | 9/2002 |
| JP | 2003-060913 | 2/2003 |
| JP | 2003-110956 | 4/2003 |
| JP | 2003-296728 | 10/2003 |
| JP | 2003-309763 | 10/2003 |
| JP | 2003-333331 | 11/2003 |
| JP | 2003-337942 | 11/2003 |
| JP | 2004-38842 | 2/2004 |
| JP | 2004-78652 | 3/2004 |
| JP | 2004-102903 | 4/2004 |
| JP | 2004-310475 | 11/2004 |
| JP | 2004-312387 | 11/2004 |
| JP | 2004-320632 | 11/2004 |
| JP | 2005-39324 | 2/2005 |
| JP | 2005-108208 | 4/2005 |
| JP | 2005-130484 | 5/2005 |
| JP | 2005-269145 | 9/2005 |
| JP | 2005-295131 | 10/2005 |
| JP | 2006-24176 | 1/2006 |
| WO | 2005/027043 | 3/2005 |
| WO | 2005/038713 | 4/2005 |

OTHER PUBLICATIONS

Carrato, S., Sicuranza, G.L., Ramponi, G., "A Gradient-Directed Unsharp Masking Algorithm for Synchrotron Radiation Angiography", 1989, Electrotechnical Conference, 1989. Proceedings., INSPEC.*

Ramponi et al, Nonlinear unsharp masking methods for image contrast enhancement, Journal of Electronic Imaging 5(3), 353-366 (Jul. 1996).*

Cheikh, F.A., Gabbouj, M., "Directional-Rational Approach for Color Image Enhancement", 2000, Circuits and Systems, 2000. Proceedings. ISCAS 2000 Geneva. The 2000 IEEE International Symposium.*

International Search Report issued Jun. 5, 2007 in International (PCT) Application No. PCT/JP2007/057468.

Richard G. Hier, et al., "Image Content Based Improvements to Locally Adaptive Video Enhancement," 1994 IEEE ICIP-94, pp. 621-624, vol. 3.

Saito, et al., "Automatic Production of Hand-Painted Images," The Journal of the Institute of Television Engineers of Japan, pp. 1528-1535, vol. 50, No. 10, Oct. 1996 (with English Abstract).

Extended European Search Report issued Apr. 9, 2010 in International (PCT) Application No. PCT/JP2006/320074.

International Search Report issued Nov. 21, 2006 in International (PCT) Application No. PCT/JP2006/320074.

Kim, et al., "Optimal Unsharp Mask for Image Sharpening and Noise Removal," Journal of Electronic Imaging, Apr.-Jun. 2005, pp. 1-13.

* cited by examiner

US 7,881,550 B2

VISUAL PROCESSING APPARATUS, VISUAL PROCESSING METHOD, PROGRAM, RECORDING MEDIUM, DISPLAY DEVICE, AND INTEGRATED CIRCUIT

This application is a Continuation of U.S. application Ser. No. 12/159,077, filed Jun. 24, 2008, which is a national stage application of International Application No. PCT/JP2007/057468, filed Apr. 3, 2007.

BACKGROUND OF THE INVENTION

1. Field of Invention

The present invention relates to visual processing apparatuses, visual processing methods, programs, recording media, display devices and integrated circuits. In particular, the present invention relates to visual processing apparatuses, visual processing methods, programs, recording media, display devices and integrated circuits, in which image adjustment is performed, so as to vary an effect of visual processing of an image.

2. Description of the Related Art

Conventionally, image processing devices that employ grayscale processing and image processing devices that employ spatial processing are known for improving the quality of the image signal of an original image.

In grayscale processing, a lookup table (hereinafter, abbreviated as "LUT") is used to effect pixel value conversion for each target pixel, regardless of the pixels surrounding that target pixel, and is also known as gamma correction. For example, to enhance the contrast, pixel value conversion is performed using a LUT for enhancing grayscale levels that frequently appear in the original image. Examples of grayscale processing using a LUT include grayscale processing in which a single LUT is selected and used for an entire original image, and grayscale processing in which a LUT is selected and used for each of a plural number of image regions that are produced by partitioning the original image.

Spatial processing uses the value of a target pixel to be filtered and the value of surrounding pixels in order to convert the value of the target pixel. Image signals that have been spatially processed are used to enhance the contrast of the original image (for example, see Patent Citation 1).

Patent Citation 1: U.S. Pat. No. 4,667,304.

PROBLEM TO BE SOLVED BY THE INVENTION

One mode of processing to improve image quality to be close to human vision is visual processing in which the value of a target pixel is converted based on the contrast between the value of the target pixel and the values of pixels in the surrounding region. In such visual processing the brightness information is extracted from a wide region around the position of the target pixel in order to further bolster the processing effect.

However, since the value of the target pixel is determined from the contrast between the value of the target pixel and the values of the surrounding pixels, if there is a sharp edge region in the surrounding region then the impact of the values of the surrounding pixels results in a visual processing output that changes gently near the edge, even in flat regions in which the pixel value fluctuates little. When a large change in luminance occurs in a flat region, a shadow-like border occurs in the region adjacent to the edge (hereinafter referred to as "side effect") and results in an unnatural image.

BRIEF SUMMARY OF THE INVENTION

The present invention was arrived at in light of the above-mentioned issues, and it is an object of the invention to provide a visual processing apparatus, a visual processing method, a program, a recording medium, a display device, and an integrated circuit, that are capable of suppressing the side effect even when an image with sharp edge regions has been input.

A first aspect of the invention is a visual processing apparatus that is provided with a surrounding image information extraction portion that extracts surrounding image information of an image signal that has been input, a visual processing portion that performs visual processing on the image signal based on the image signal and the surrounding image information, a control signal generation portion that outputs an effect adjustment signal for setting the effect of the visual processing, and an effect adjustment portion that sets the effect of the visual processing according to the effect adjustment signal. The control signal generation portion determines edge proximal regions and flat regions that are present in an image region of the image that is formed by the image signal, and generates an effect adjustment signal that realizes the visual processing based on the image signal and the surrounding image information, on those image regions that have been determined not to be an edge proximal region or a flat region, whereas it generates an effect adjustment signal that realizes visual processing with a weaker effect than the effect of the visual processing based on the image signal and the surrounding image information, on those image regions that have been determined to be an edge proximal region as well as a flat region.

With this visual processing apparatus, the control signal generation portion outputs an effect adjustment signal for setting the effect of visual processing, the surrounding image information extraction portion extracts surrounding image information of the image signal that has been input, and the effect adjustment portion sets the effect of the visual processing according to the effect adjustment signal, and thus the effect of visual processing can be varied according to the effect adjustment signal, and side effects can be inhibited by adjusting the visual processing effect in image regions where side effects occur. Further, with this visual processing apparatus, the control signal generation portion determines edge proximal regions and flat regions that are present in an image region of the image that is formed by the image signal, and generates an effect adjustment signal that realizes the visual processing based on the image signal and the surrounding image information on those image regions that have been determined not to be an edge proximal region or a flat region, whereas it generates an effect adjustment signal that realizes visual processing with a weaker effect than the effect of the visual processing based on the image signal and the surrounding image information on those image regions that have been determined to be an edge proximal region as well as a flat region, and thus the effect of visual processing on image regions in which side effects readily occur is weakened, making it possible to inhibit the occurrence of side effects. In particular, the side effect in which a so-called halo occurs in an image can be efficiently inhibited.

It should be noted that here, "visual processing with a weak effect" is a concept that also includes not generating a visual processing effect at all, that is, not performing visual processing. Further, "surrounding image information" refers to information that is drawn from the target pixels and the pixels surrounding the target pixels, and for example is the mean brightness (grayscale value) of a region of N×N pixels with the surrounding pixels at the center. It should be that in order to obtain surrounding image information it is not always necessary to perform processing in pixel units, and it is also possible to obtain surrounding image information by performing processing in block units, each made of a plurality of pixels.

A second aspect of the invention is the first aspect of the invention, in which the visual processing portion performs visual processing for adjusting the local contrast on the image signal based on the image signal and the surrounding image information.

Thus, the side effects can be inhibited even in a visual processing apparatus that realizes visual processing in which the local contrast is adjusted.

It should be noted that here, "local contrast" refers to the contrast that is gained from comparison of the brightness between the target pixel and the pixels surrounding it, and "visual processing for adjusting the local contrast" for example refers to processing in which the contrast of a local image region is adjusted based on the brightness ratio between the target pixel and the surrounding pixels in a local image region. It should be noted that it goes without saying that it is possible to perform processing in block units as well as in pixel units. Further, "visual processing for adjusting the local contrast" is a concept that includes processing that is based on a contrast in color information (such as luminance, vividness, and hue), as well as the brightness contrast.

A third aspect of the invention is the first aspect or second aspect of the invention, in which the effect adjustment signal generation portion outputs the effect adjustment signal according to an amount of change in the surrounding image information.

Thus, it is possible to inhibit the side effects that occur in conjunction with a change in the surrounding image information.

A fourth aspect of the invention is the first aspect or second aspect of the invention, in which the control signal generation portion includes a change amount detection portion for detecting an amount of change in the surrounding image information, and an effect adjustment signal generation portion that generates the effect adjustment signal based on the amount of change that has been detected by the change amount detection portion.

Thus, it is possible to inhibit the side effects that occur in conjunction with the amount of change in the surrounding image information.

A fifth aspect of the invention is the first aspect or second aspect of the invention, in which the control signal generation portion includes a flatness detection portion that detects a degree of flatness of flat regions, whose difference in luminance with an adjacent region is at or below a predetermined value, from the image signal, an edge detection portion that detects an edge amount of an edge region, whose difference in luminance with an adjacent region is at or above a predetermined value, from the image signal, an edge proximity detection portion for calculating a degree of edge proximity that indicates the degree to which an image region is near an edge, from the edge amount, and an effect adjustment signal generation portion that generates the effect adjustment signal based on the degree of flatness that has been detected by the flatness detection portion and the degree of edge proximity that has been calculated by the edge proximity detection portion.

Thus, the side effects in flat regions that are near an edge region can be inhibited even when an image that has sharp edge regions is input.

A sixth aspect of the invention is any one of the first aspect through the fifth aspect of the invention, in which the effect adjustment portion outputs a first synthesized signal that is obtained by synthesizing the image signal and the surrounding image information according to the effect adjustment signal, and the visual processing portion performs visual processing on the image signal based on the first synthesized signal and the image signal.

Thus, additionally, the visual processing portion can select different grayscale conversion processing based on the first synthesized signal, and can visually process the image signal based on the grayscale conversion processing that has been selected, and thus can vary (adjust) the effect of the visual processing.

A seventh aspect of the invention is any one of the first aspect through the fifth aspect of the invention, in which the effect adjustment portion outputs a second synthesized signal that is obtained by synthesizing the image signal and the output that has been visually processed by the visual processing portion according to the effect adjustment signal.

Thus, additionally, it is possible to perform the output after changing the ratio of the image signal and the processed signal in accordance with the effect adjustment signal, and this allows the effect of visual processing to be varied (adjusted).

An eighth aspect of the invention is a visual processing method that includes a surrounding image information extraction step of extracting surrounding image information of an image signal that has been input, a visual processing step of performing visual processing on the image signal based on the image signal and the surrounding image information, a control signal generation step of outputting an effect adjustment signal for setting the effect of the visual processing, and an effect adjustment step of setting the effect of the visual processing according to the effect adjustment signal. In the control signal generation step, edge proximal regions and flat regions that are present in an image region of the image that is formed by the image signal are determined, and an effect adjustment signal that realizes the visual processing based on the image signal and the surrounding image information on those image regions that have been determined not to be an edge proximal region or a flat region, is generated, whereas an effect adjustment signal that realizes visual processing with a weaker effect than the effect of the visual processing based on the image signal and the surrounding image information on those image regions that have been determined to be an edge proximal region as well as a flat region, is generated.

Thus, it is possible to achieve a visual processing method that attains the same effects as the first aspect of the invention.

A ninth aspect of the invention is a program for causing a computer to execute a surrounding image information extraction step of extracting surrounding image information of an image signal that has been input, a visual processing step of performing visual processing on the image signal based on the image signal and the surrounding image information, a control signal generation step of outputting an effect adjustment signal for setting the effect of the visual processing, and an effect adjustment step of setting the effect of the visual processing according to the effect adjustment signal. In the control signal generation step, edge proximal regions and flat regions that are present in an image region of the image that is formed by the image signal are determined, and an effect adjustment signal that realizes the visual processing based on the image signal and the surrounding image information on those image regions that have been determined not to be an edge proximal region or a flat region, is generated, whereas an effect adjustment signal that realizes visual processing with a weaker effect than the effect of the visual processing based on the image signal and the surrounding image information on those image regions that have been determined to be an edge proximal region as well as a flat region, is generated.

Thus, it is possible to achieve a program that attains the same effects as the first aspect of the invention.

A tenth aspect of the invention is a non-transitory computer-readable recording (storage) medium having a program recorded/stored thereon for causing a computer to execute a surrounding image information extraction step of extracting surrounding image information of an image signal that has been input, a visual processing step of performing visual processing on the image signal based on the image signal and the surrounding image information, a control signal generation step of outputting an effect adjustment signal for setting the effect of the visual processing, and an effect adjustment step of setting the effect of the visual processing according to the effect adjustment signal. In the control signal generation step, edge proximal regions and flat regions that are present in an image region of the image that is formed by the image signal are determined, and an effect adjustment signal that realizes the visual processing based on the image signal and the surrounding image information on those image regions that have been determined not to be an edge proximal region or a flat region, is generated, whereas an effect adjustment signal that realizes visual processing with a weaker effect than the effect of the visual processing based on the image signal and the surrounding image information on those image regions that have been determined to be an edge proximal region as well as a flat region, is generated.

Thus, it is possible to achieve a recording medium that attains the same effects as the first aspect of the invention.

An eleventh aspect of the invention is an integrated circuit that includes a surrounding image information extraction portion that extracts surrounding image information of an image signal that has been input, a visual processing portion that performs visual processing on the image signal based on the image signal and the surrounding image information, a control signal generation portion that outputs an effect adjustment signal for setting the effect of the visual processing, and an effect adjustment portion that sets the effect of the visual processing according to the effect adjustment signal. The control signal generation portion determines edge proximal regions and flat regions that are present in an image region of the image that is formed by the image signal, and generates an effect adjustment signal that realizes the visual processing based on the image signal and the surrounding image information, on those image regions that have been determined not to be an edge proximal region or a flat region, whereas it generates an effect adjustment signal that realizes visual processing with a weaker effect than the effect of the visual processing based on the image signal and the surrounding image information, on those image regions that have been determined to be an edge proximal region as well as a flat region.

Thus, it is possible to achieve an integrated circuit that attains the same effects as the first aspect of the invention.

A twelfth aspect of the invention is a display device that includes a data reception portion that receives image data that have been transmitted or broadcast, a decoding portion that decodes the image data that have been received into video data, the visual processing apparatus according to any one of the first through seventh aspects of the invention for visually processing the decoded video data and outputting an output signal, and a display portion that performs a display of the output signal that has been visually processed by the visual processing apparatus.

Thus, it is possible to achieve visual processing that attains the same effects as in the first through seventh aspects of the invention on a display device.

With the invention, it is possible to provide a visual processing apparatus, a visual processing method, a program, a recording medium, and an integrated circuit that can inhibit side effects even when an image that has sharp edge regions has been input.

EXPLANATION OF REFERENCE

Figure 1:
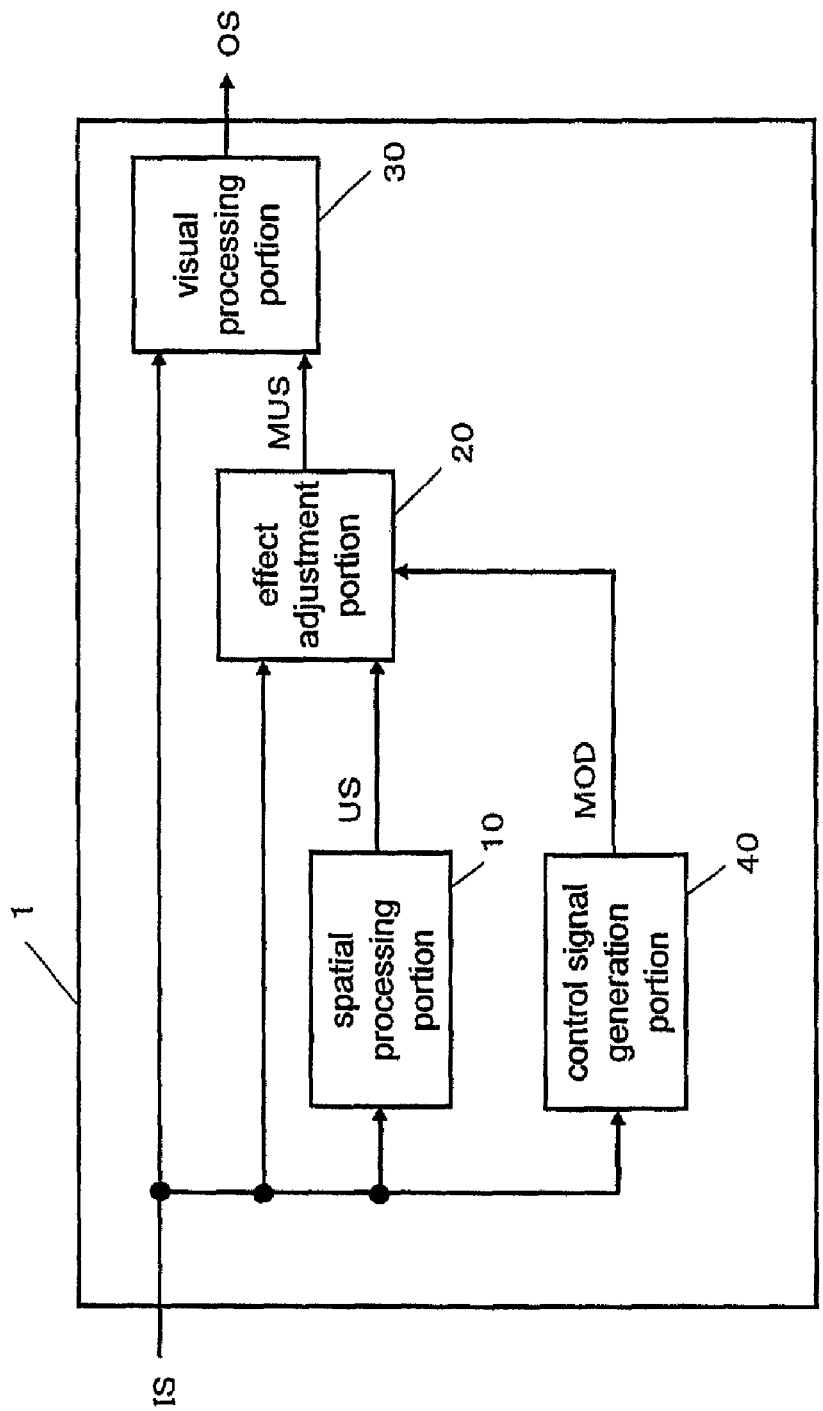
FIG. 1 is a block diagram showing the configuration of a visual processing apparatus of the first embodiment of the invention.

| | |
|---|---|
| 1, 2, 3 | visual processing apparatus |
| 4 | gain-type visual processing system |
| 5 | gain-type visual processing apparatus |
| 10 | spatial processing portion |
| 11 | multiplier |
| 12 | divider |
| 20, 21, 22 | effect adjustment portion |
| 30, 31, 32 | visual processing portion |
| 40, 70 | control signal generation portion |
| 41 | edge detection portion |
| 42 | edge proximity detection portion |
| 43 | flatness detection portion |
| 44, 72 | effect adjustment signal generation portion |
| 60 | profile A |
| 61 | profile B |
| 71 | change amount detection portion |
| 100 | CPU |
| 101 | ROM |
| 102 | RAM |
| 103 | input portion |
| 104 | output portion |
| 105 | memory portion |
| 106 | communications portion |
| 107 | drive |
| 108 | disk |
| 109 | memory card |
| 110 | bus |
| 111 | network |

DETAILED DESCRIPTION OF THE INVENTION

Below, embodiments of the invention are described in detail with reference to the drawings.

First Embodiment

In general, natural images have many gradations, and by performing visual processing on natural images it is possible to obtain sharp images with high local contrast, for example. On the other hand, when visual processing is performed on an image with steep edges, the side effect is easily stands out. When the strength of the visual processing is reduced in order to suppress this side effect, the processing becomes weak even for natural images and the resulting image is not sharp.

Thus, by toning down visual processing only near edges, it is possible to maintain the processing effect for the natural image overall while suppressing the side effect near edges.

The visual processing apparatus of the first embodiment of the invention performs adjustment (of the strength or correction amount) by outputting an effect adjustment signal for varying the effect of the visual processing in order to vary the effect of visual processing according to the effect adjustment signal.

It also performs adjustment by detecting regions adjacent to an edge or flat regions adjacent to an edge in the image targeted for visual processing, and creates an effect adjustment signal from the edge amount and the degree of flatness and varies the effect of visual processing in accordance with the effect adjustment signal.

Thus, even when an image with a steep edge region has been input to the visual processing apparatus, it is possible to obtain the visual processing effect while suppressing the side effect near edges.

Here, visual processing is processing for giving characteristics that are close to human vision, and determines the value of an output signal based on the contrast between the value of a target pixel of the image signal that has been input and the values (brightness) of pixels surrounding that target pixel. The visual processing may be adopted for backlight correction, knee processing, D range compression, color processing, and brightness adjustment (including grayscale processing and contrast adjustment), for example.

In this embodiment of the invention, the luminance component Y or the brightness component L of a YCbCr color space, a YUV color space, a Lab color space, a Luv color space, a YIQ color space, or a YPbPr color space is defined as the luminance signal. Hereinafter, the luminance signal is described as the image signal.

The visual processing apparatus of the first embodiment of the invention is described using FIGS. 1 through 8. FIG. 1 is a block diagram showing the configuration of a visual processing apparatus 1 according to the first embodiment of the invention.

In FIG. 1, the visual processing apparatus 1 according to the first embodiment of the invention is provided with a spatial processing portion 10 for outputting surrounding image information (unsharp signal) US from an image signal that has been input, a control signal generation portion 40 for outputting an effect adjustment signal MOD in accordance with the degree of flatness of the edge proximal region, an effect adjustment portion 20 for outputting a synthesized signal MUS that is synthesized changing the proportion of the image signal IS and the surrounding image information US according to the effect adjustment signal MOD, and a visual processing portion 30 for visually processing the image signal IS based on the synthesized signal MUS and the image signal IS.

The various functional sections of the visual processing apparatus 1 are described below.

The spatial processing portion 10 extracts the value of a target pixel and the values of pixels in the region around the target pixel (hereinafter, called "surrounding pixels") from the image signal IS, and uses the values of the extracted pixels to filter the image signal IS. For example, the spatial processing portion 10 performs a low-pass filter on the image signal IS to create an unsharp signal US. The unsharp signal US is created by a computation such as the following.

$$US = (\Sigma[W_{ij}] \times [A_{ij}]) \div (\Sigma[W_{ij}])$$

Here, $[W_{ij}]$ is the weight coefficient of the pixel located at the i-th row j-th column, of the target pixel and the surrounding pixels, and $[A_{ij}]$ is the value of the pixel located at the i-th row j-th column, of the target pixel and the surrounding pixels. The symbol $\Sigma$ means to take the sum of the target pixel and the surrounding pixels.

It should be noted that it is possible to assign a weight coefficient with a smaller value the larger the absolute value of the difference between pixel values, and it is also possible to assign a smaller weight coefficient the larger the distance from the target pixel. The region of the surrounding pixels is a size that is set in advance in accordance with the effect, and the visual effect can be increased by setting this region to larger than a predetermined size. For example, if the size of the target image is 1024 pixels vertically by 768 pixels horizontally, then by creating an unsharp signal US from a region that is at least 80 pixels vertically by 80 pixels horizontally, the visual effect can be increased compared to local regions of about 3 pixels vertically by 3 pixels horizontally.

A FIR (Finite Impulse Response)-type low-pass spatial filter or an IIR (Infinite Impulse Response)-type low-pass spatial filter, which are commonly used to create unsharp signals, can be used as the low-pass spatial filter.

Next, the effect adjustment portion 20 synthesizes the image signal IS and the unsharp signal US by interpolation in accordance with the effect adjustment signal MOD that has been output from the control signal generation portion 40, and outputs a synthesized signal MUS. The synthesized signal MUS is obtained by an interpolation computation such as that of Eq. 1 according to the effect adjustment signal MOD. The control signal generation section 40 is discussed later.

$$MUS = US \times MOD + IS \times (1.0 - MOD) \quad \text{Eq. 1}$$

Here, the value of the effect adjustment signal MOD is changed within the range of 0.0 to 1.0, with no effect when the value of the effect adjustment signal MOD is 0.0 and a maximum processing strength when the value of the effect adjustment signal MOD is 1.0. It should be noted that Eq. 1 can be modified as in Eq. 2, and the synthesized signal MUS similarly can be created.

$$MUS = (US - IS) \times MOD + IS \quad \text{Eq. 2}$$

Next, the visual processing portion 30 converts the grayscale of the image signal IS according to the synthesized signal MUS from the effect adjustment portion 20.

Figure 2:
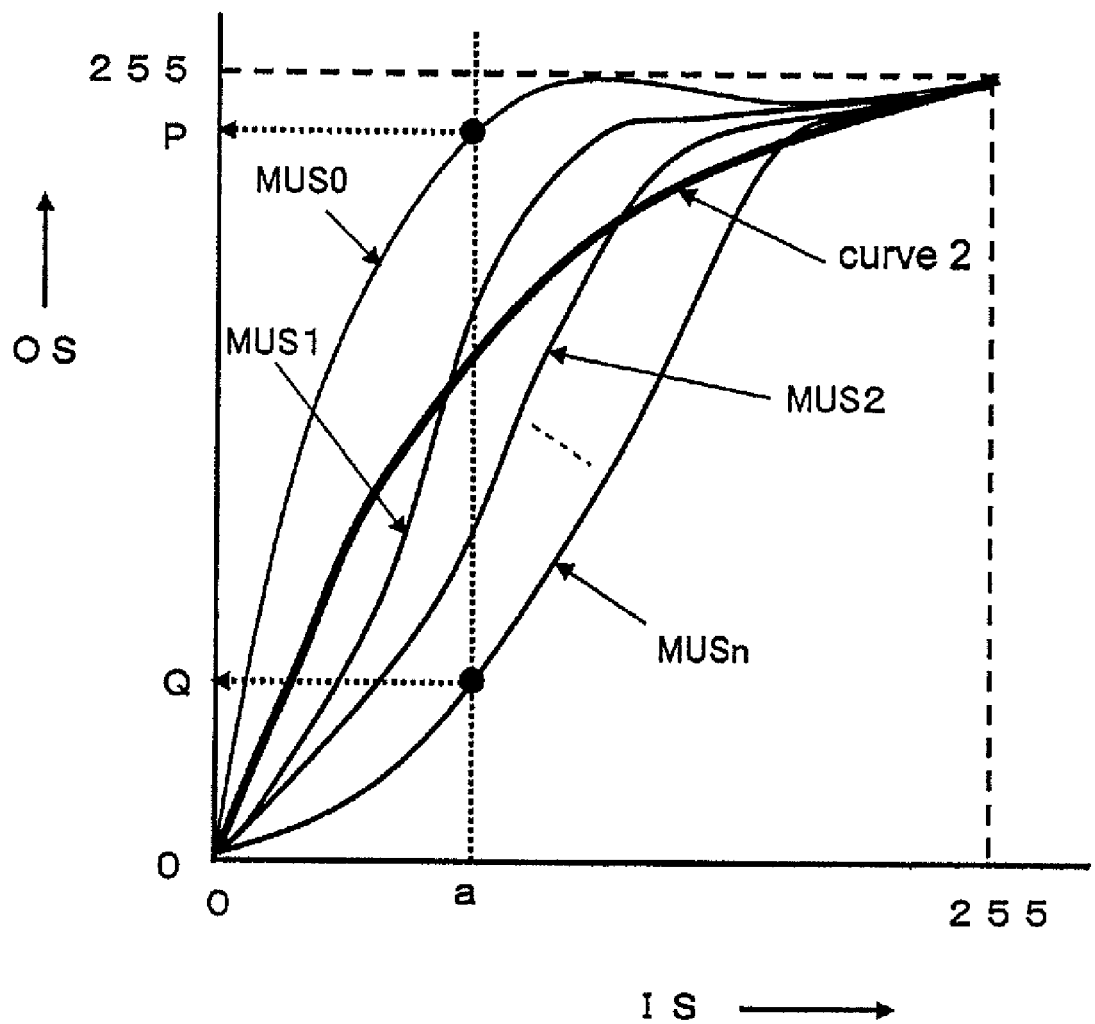
FIG. 2 is an explanatory diagram for describing the two-dimensional grayscale characteristics of the same.

The visual processing portion 30 for example performs grayscale conversion based on the two-dimensional grayscale conversion characteristics shown in FIG. 2. Here, two-dimensional grayscale conversion refers to grayscale conversion in which the value of an output is determined for the two inputs, that is, the synthesized signal MUS and the image signal IS. Based on the two-dimensional grayscale conversion characteristics, the visual processing portion 30 outputs a processed signal OS for the image signal IS and the synthesized signal MUS. Various visual effects can be produced from the grayscale conversion characteristics.

The two-dimensional grayscale conversion characteristics are described using FIG. 2. FIG. 2 is an explanatory diagram for describing the two-dimensional grayscale conversion characteristics. Here, the horizontal axis is the image signal IS that has been input, and the vertical axis is the output of the converted processed signal OS.

As shown in FIG. 2, the two-dimensional grayscale conversion has predetermined grayscale conversion characteristics that match the signal level of the synthesized signals MUS0 to MUSn. That is, two-dimensional grayscale conversion is achieved by converting the input signal IS (the grayscale value of IS) into a processed signal OS (the grayscale value of OS) with a grayscale conversion curve that has been selected from among the grayscale conversion curves MUS0 to MUSn based on the signal level (grayscale value) of the synthesized signal MUS. For example, the grayscale conversion curve MUS1 of FIG. 2 is selected when the MUS signal level (grayscale value) is 1, and the grayscale conversion curve MUS120 is selected when the MUS signal level (grayscale value) is 120. However, it is not absolutely necessary to prepare the same number of grayscale conversion curves MUS0 to MUSn as the number of grayscale values of the MUS signal, and for example it is also possible to prepare a smaller number of grayscale conversion curves MUS0 to MUSn than the number of grayscale values of the MUS signal, and with regard to the grayscale conversion curves that have not been readied, to achieve two-dimensional grayscale conversion by calculating a grayscale conversion curve that corresponds to the grayscale value of the MUS signal by interpolation from the grayscale conversion curves that have been prepared.

In the two-dimensional grayscale conversion, when the pixel value of the image signal IS is an 8-bit value, the pixel value of the output signal OS that corresponds to the value of the image signal IS separated into 256 levels is determined based on the predetermined two-dimensional grayscale conversion characteristics. The grayscale conversion characteristics are grayscale conversion curves that have predetermined gamma conversion characteristics, and the relationship is such that the output monotonically decreases along with the subscript of the synthesized signal MUS. It should be noted that even if there are places where the output partially does not monotonically decrease along with the subscript of the synthesized signal MUS, it is sufficient for it to be substantially monotonically decreasing. As shown in FIG. 2, in the two-dimensional grayscale conversion characteristics, the relationship of (the output value when MUS=MUS0) (the output value when MUS=MUS1)≧ ... ≧ (the output value when MUS=MUSn) is satisfied for the brightness values of all image signal IS pixels.

With the two-dimensional grayscale conversion characteristics shown in FIG. 2, for an input image signal IS with a value "a," the visual processing portion 30 selects MUS0 when the brightness value of the surrounding region is small so as to obtain a value of "P" for the processed signal OS, whereas it selects MUSn when the brightness value of the surrounding region is large so as to obtain a value of "Q" for the processed signal OS. In this way, even when the input image signal IS has the value "a," the processed signal OS can be significantly varied between the value "P" to the value "Q" depending the change in the brightness value of the surrounding region. By doing this, the contrast of dark areas can be enhanced in accordance with the synthesized signal MUS.

On the other hand, if the synthesized signal MUS is set equal to the image signal IS so as to eliminate the effect of visual processing, then it is possible to have the grayscale conversion characteristics of curve 2 shown in FIG. 2. With the grayscale conversion characteristics of curve 2, brightness adjustment (gamma conversion) of the entire image is possible, but there is no visual effect such as an increase in the contrast only in local dark area regions.

It should be noted that it is possible to produce various visual processing effects by changing the two-dimensional grayscale conversion characteristics, and thus the processing can be adopted for knee processing, DR compression, color processing, or brightness adjustment (including grayscale processing and contrast adjustment), for example.

Figure 3A:
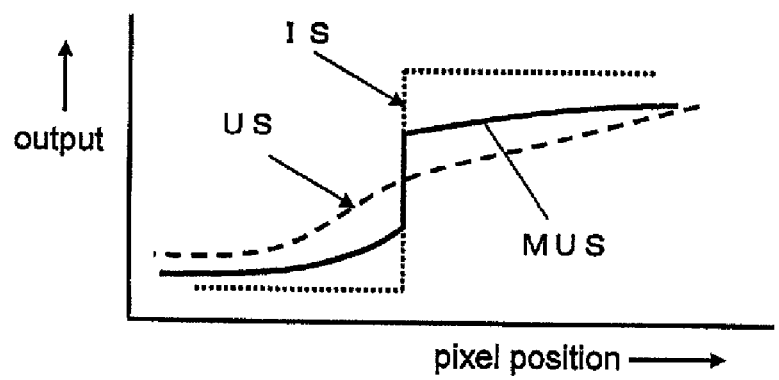
FIGS. 3A and 3B describe the output of the processed signal OS of the same.
Figure 3B:
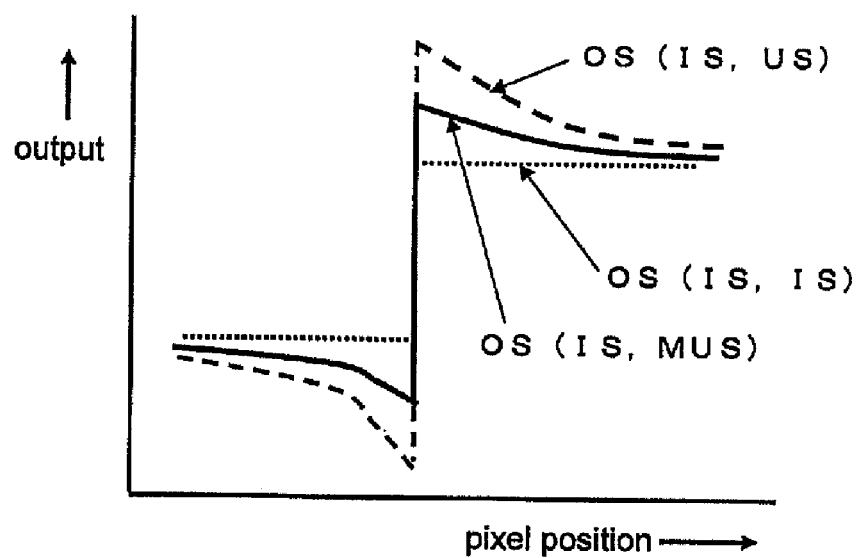

Next, in the visual processing portion 30, the processed signal OS when the effect of visual processing has been changed based on the synthesized signal MUS is described using FIGS. 3(a) and 3(b). FIG. 3 is an explanatory diagram for describing the processed signal OS output.

In FIG. 3(a), the horizontal axis is the pixel position to be processed, and the vertical axis is the output of the synthesized signal MUS.

For example, when the value of the effect adjustment signal MOD has been set to 0.5, the synthesized signal MUS becomes an output that is intermediate between the image signal IS and the unsharp signal US.

At this time, as shown in FIG. 3(b), if OS(IS,IS) is a processed signal OS that has been visually processed based on only the image signal IS and OS(IS,US) is a processed signal OS that has been visually processed based on the image signal IS and the unsharp signal US, then the processed signal OS(IS,MUS) that is obtained by visual processing according to the image signal IS and the synthesized signal MUS is an output that is intermediate between OS(IS,IS) and OS(IS, US).

Thus, the synthesized signal MUS is equal to US when the value of the effect adjustment signal MOD is 1.0, and a processed signal OS(IS,US) in which there is a maximum visual processing effect is output. On the other hand, the synthesized signal MUS is equal to IS when the value of the effect adjustment signal MOD is 0.0, and a processed signal OS(IS,IS) in which there is no visual processing effect is output.

In this way, the visual processing portion 30 can strengthen or weaken the effect of visual processing of the dark area contrast based on the synthesized signal MUS. Thus, the visual processing apparatus 1 can achieve various visual effects with varying effects, from the effect of processing in which only the brightness of the overall image is transformed, to the effect of processing in which the contrast of a local region is varied (changed) with the surrounding brightness.

It should be noted that the visual processing apparatus 1 can achieve knee processing, DR compression processing, and color processing, for example, by changing the two-dimensional grayscale conversion characteristics.

It is also possible for the visual processing portion 30 to have a two-dimensional lookup table (hereinafter, referred to as "2D LUT"). Grayscale conversion is performed by setting characteristic data (hereinafter, referred to as the "profile") shown in FIG. 2 in the 2D LUT of the visual processing portion 30.

The visual processing portion 30 can also perform visual processing with an arithmetic circuit. In particular, if profiles, which are characteristics that can be approximated by a simple straight line, are set in the 2D LUT of the visual processing portion 30, then it is possible to eliminate the table of the 2D LUT and reduce the circuit scale of the visual processing apparatus 1.

Figure 4:
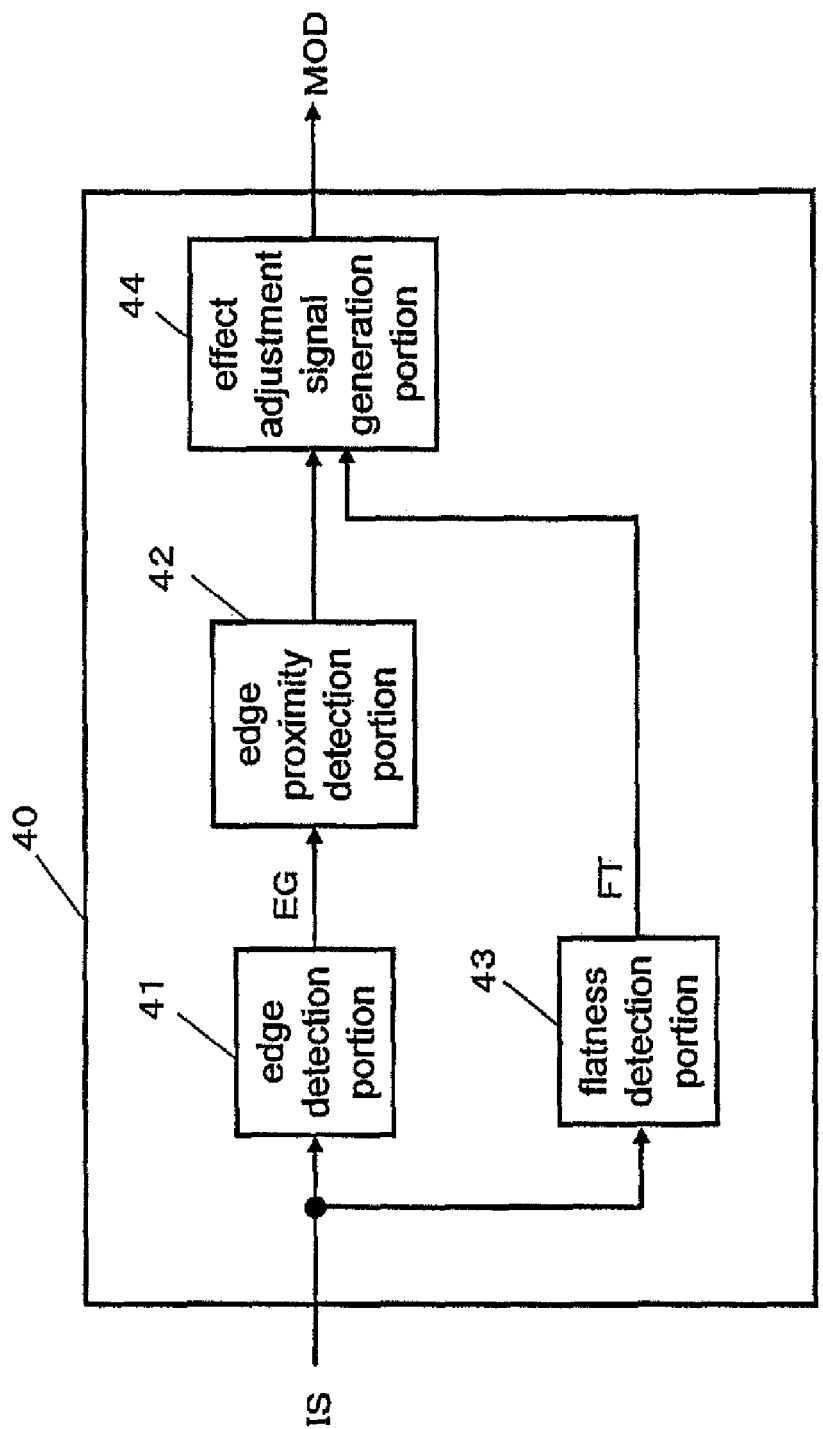
FIG. 4 is a block diagram that shows the configuration of the control signal generation portion of the same.
Figure 5:
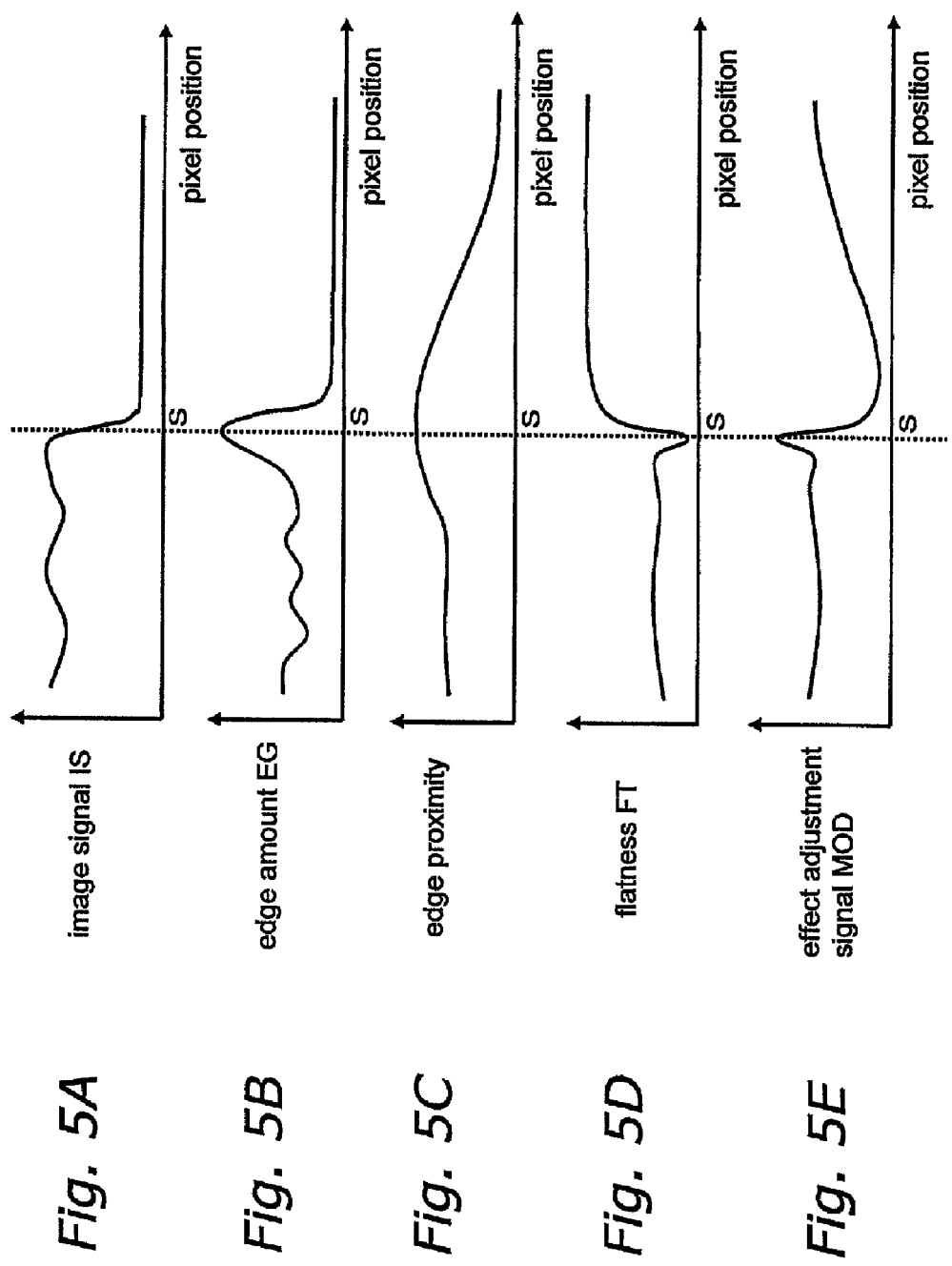
FIGS. 5A-5E describe the output of the effect adjustment signal of the same.

Next, the control signal generation portion 40 is described using FIGS. 4 and 5($a$)-5($e$). FIG. 4 is a block diagram showing the configuration of the control signal generation portion 40, and FIGS. 5($a$)-5($e$) are an explanatory diagrams for describing the output of the effect adjustment signal MOD.

As shown in FIG. 4, the control signal generation portion 40 is provided with an edge detection portion 41 for detecting the edge amount, that is, the luminance difference of each adjacent region, from the image signal IS, an edge proximity detection portion 42 for detecting the degree of proximity of the edge region from the edge amount, a flatness detection portion 43 for detecting the degree of flatness of flat regions whose luminance difference with an adjacent region is at or below a predetermined value, and an effect adjustment signal generation portion 44 for outputting an effect adjustment signal MOD in accordance with the degree of edge proximity and the degree of flatness.

The edge detection portion 41 detects the edge amount from the image signal IS for each region of a predetermined range. The edge detection portion 41 detects the edge amount EG using an edge detection filter (not shown) such as a first derivative filter like a Sobel filter or a Prewitt filter or a second derivative filter like a Laplacian filter. The edge detection portion 41 for example outputs an edge amount like that shown in FIG. 5($b$) when the image signal IS shown in FIG. 5($a$) has been input. Here, in FIG. 5($a$) the vertical axis is the value of the image signal IS, and the horizontal axis is the pixel position of the pixel being processed. The vertical axis in FIG. 5($b$) is the edge amount EG, and the horizontal axis is the pixel position of the pixel being processed.

The edge proximity detection portion 42 detects regions near an edge. For example, the edge proximity detection portion 42 applies a low-pass filter on the edge amount that is detected for each predetermined region, and outputs a degree of proximity that becomes a larger output as the edge proximity increases. The degree of edge proximity may also be set by spatially shifting the edge amount EG horizontally or vertically and adding or averaging these. It is also possible for the degree of edge proximity to be the edge amount EG processed by a MAX filter. For example, as shown in FIG. 5($c$), the edge proximity detection portion 42 outputs a degree of edge proximity that becomes a larger output as the edge proximity increases. Here, the vertical axis in FIG. 5($c$) is the degree of edge proximity, and the horizontal axis is the pixel position of the pixel being processed.

To determine whether a region is flat, the flatness detection portion 43 preferably calculates the flatness FT using the luminance difference in a wider range than the edge detection portion 41. This is because people can recognize side effects, such as the feeling that the image is not natural, when looking at an image looking for flat regions that have a relatively wide area. For example, when viewing a spatially-processed image on a high vision (HDTV) display device at the optimal viewing distance of 3H (H is the height of the screen), the flatness FT preferably is detected in a range that is at least H/20 (this corresponds to 54×54 pixels in the case of full HD (full spec high vision) (1920×1080 pixels). However, the increasing size of screens has led to a shorter relative viewing distance, and thus it may also be possible to detect the flatness FT in a range of at least H/30 (similarly, this corresponds to 36×36 pixels). At least some effect is obtained by detecting the flatness FT in a range of H/50 or more (similarly, this corresponds to 22×22 pixels).

The flatness detection portion 43 detects the flatness degree (flatness FT) of flat regions in which the difference in luminance with an adjacent region is at or below a threshold value. For example, the area of regions in which the luminance difference with the adjacent region is at or below a predetermined value is found, and a larger flatness degree (flatness FT) is output the larger the area.

As shown in FIG. 5($d$), the flatness detection portion 43 detects the difference in luminance from the adjacent region from the output of the edge amount of FIG. 5($b$), and outputs a larger flatness degree (flatness FT) the smaller the luminance difference. The vertical axis in FIG. 5($d$) is the flatness FT, and the horizontal axis is the pixel position of the pixel being processed.

As shown in FIG. 5($e$), the effect adjustment signal generation portion 44 hybridizes the degree of proximity of FIG. 5($c$) and the degree of flatness of FIG. 5($d$), and outputs an effect adjustment signal MOD that weakens the visual effect the larger the edge proximity degree and the higher the degree of flatness. Here, the vertical axis in FIG. 5($d$) is the output of the effect adjustment signal MOD, and the horizontal axis is the pixel position of the pixel being processed. The visual effect by the visual processing apparatus 1 becomes stronger the larger the value of the effect adjustment signal MOD.

By doing this, the effect adjustment signal generation portion 44, as shown in FIG. 5($e$), creates an output that weakens the visual effect in regions that are near an edge, and creates an output that strengths the visual effect in regions that are removed from regions that are near an edge. Further, in regions near an edge, based on the degree of flatness the effect adjustment signal generation portion 44 creates an output that weakens the visual effect the larger the degree of flatness, and creates an output that strengthens the visual effect the smaller the degree of flatness.

Figure 13:
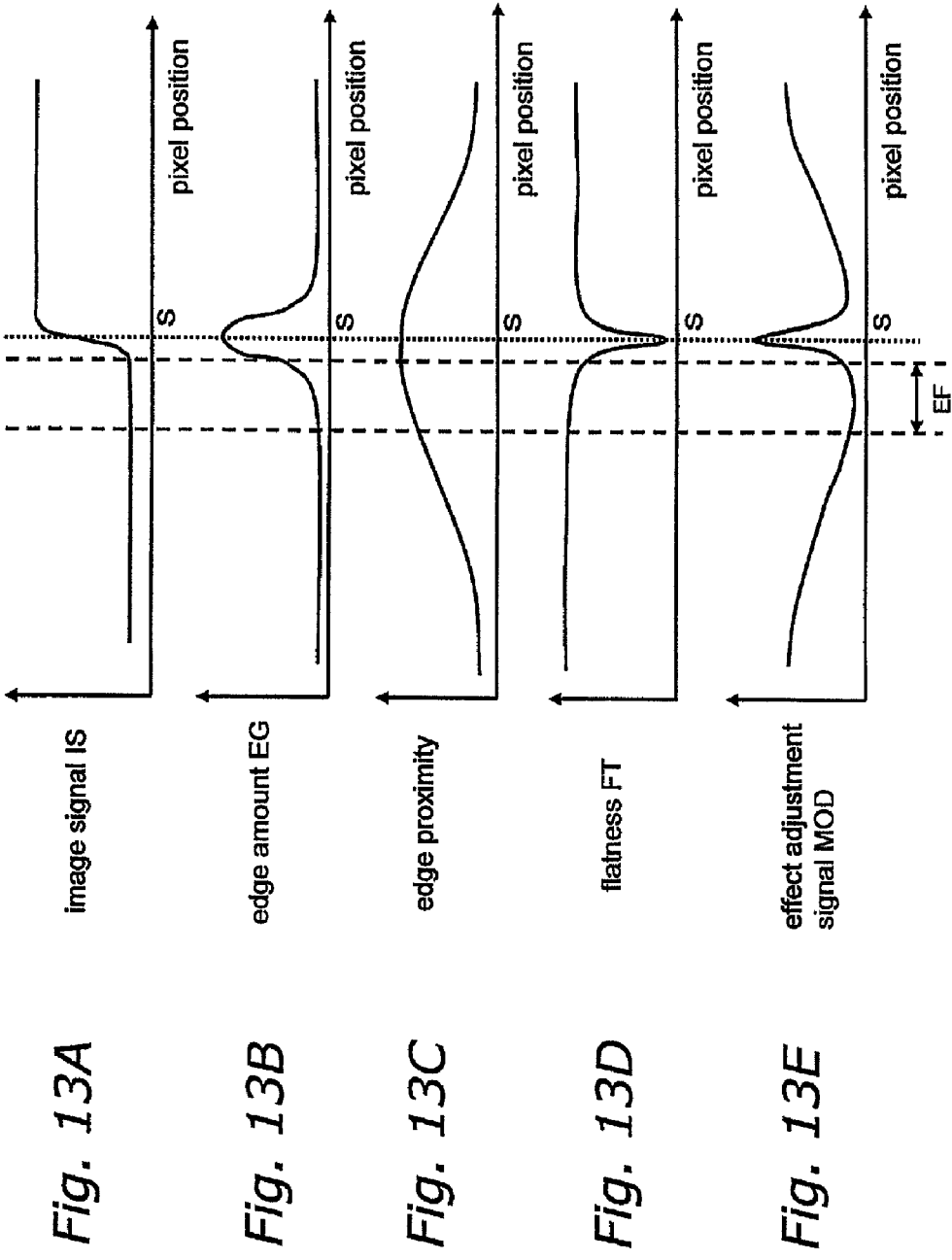
FIGS. 13A-13E describe the output of the effect adjustment signal of the visual processing apparatus according to the first embodiment of the invention.

FIG. 13($a$) shows the relationship between the pixel position and the image signal IS, FIG. 13($b$) shows the relationship between the pixel position and the edge amount EG, FIG. 13($c$) shows the relationship between the pixel position and the edge proximity, FIG. 13($d$) shows the relationship between the pixel position and the flatness FT, and FIG. 13($e$) shows the relationship between the pixel position and the effect adjustment signal MOD. It should be noted that FIG. 13($b$) shows the edge amount EG, FIG. 13($c$) shows the edge proximity, FIG. 13(d) shows the flatness FT, and FIG. 13(e) shows the effect adjustment signal MOD, when the image signal IS shown in FIG. 13(a) has been input. Here, the region indicated by EF in FIG. 13 is the flatness area near the edge. The effect adjustment signal MOD is smaller in the flat region EF near the edge.

Thus, with the visual processing apparatus 1, it is possible to achieve visual processing with which the side effect can be reduced only near edges, and which has an excellent visual processing effect for natural images.

Figure 6:
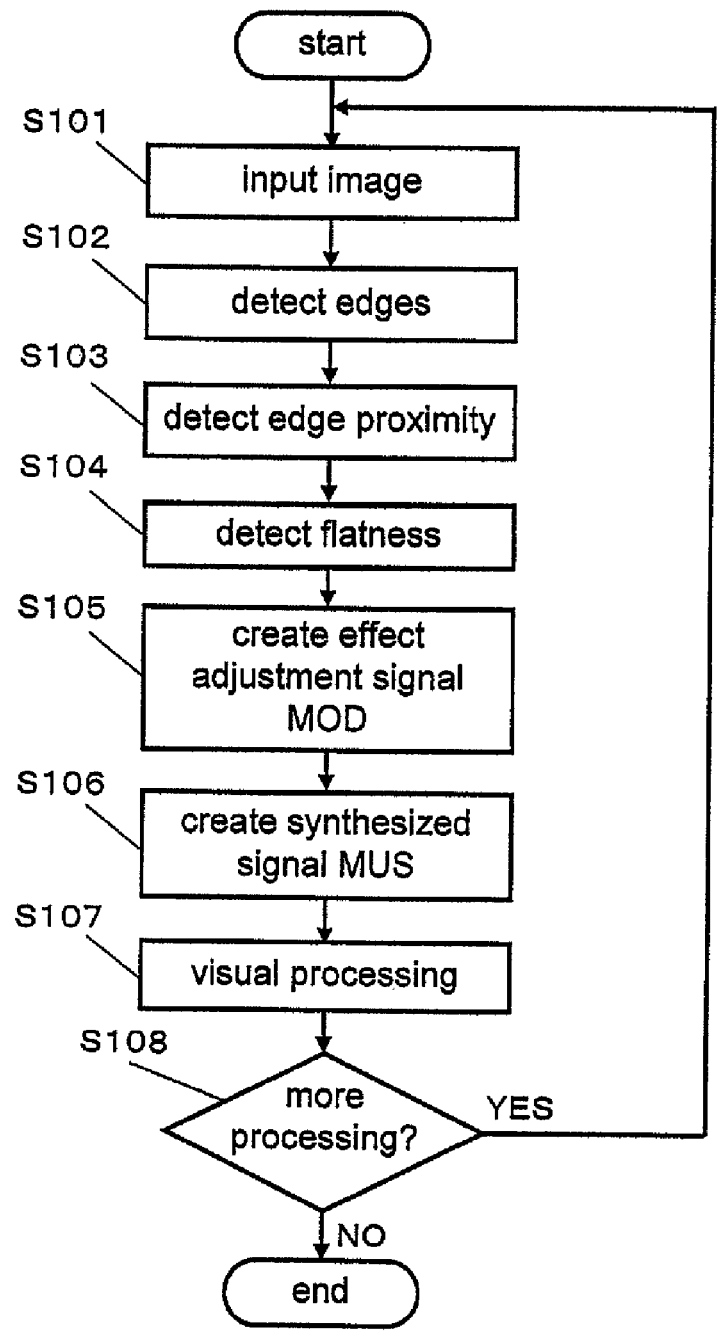
FIG. 6 is a flowchart that describes the operation of the visual processing apparatus of the same.

Next, the operation of the visual processing apparatus 1 is described using FIG. 6. FIG. 6 is a flowchart for describing the operation of the visual processing apparatus 1.

Figure 8:
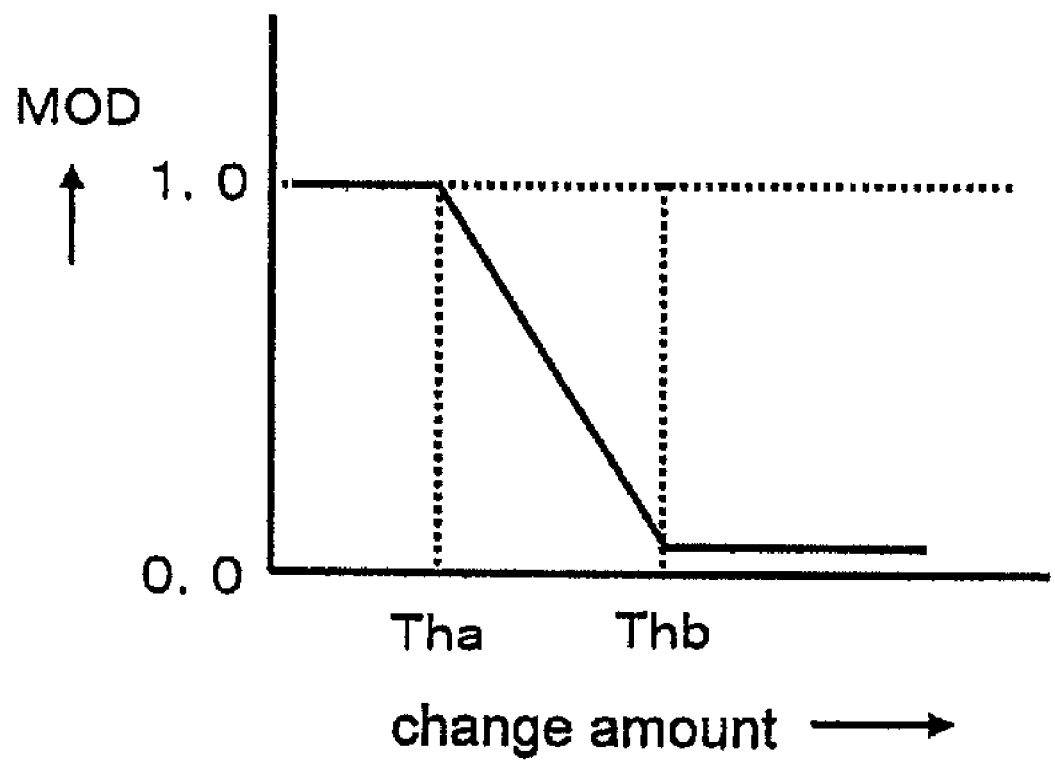
FIG. 8 is an explanatory diagram for describing the effect adjustment signal of a modified example of the same.

As shown in FIG. 8, an image is input to the visual processing apparatus 1 (S101), and the edge detection portion 41 detects an edge amount, which is the difference in luminance, for each adjacent region from the image signal IS (S102).

Next, the edge proximity detection portion 42 of the visual processing apparatus 1 processes the edge amounts with a low-pass filter to detect a degree of proximity from the edge amounts (S103). The flatness detection portion 43 of the visual processing apparatus 1 then detects luminance difference from the edge amount to detect the degree of flatness near the edges (S104).

Next, the effect adjustment signal generation portion 44 of the visual processing apparatus 1 combines the proximity degree that has been output from the edge proximity detection portion 42 and the flatness degree that has been output from the flatness detection portion 43 to create an effect adjustment signal MOD (S105).

Next, the visual processing portion 20 of the visual processing apparatus 1 creates a synthesized signal MUS that is synthesized changing the ratio of the image signal IS and the unsharp signal US in accordance with the effect adjustment signal MOD (S106).

Next, the visual processing portion 30 of the visual processing apparatus 1 selects a single curve from the two-dimensional grayscale conversion characteristics shown in FIG. 2 based on the synthesized signal MUS, and converts the image signal IS (S107). By doing this, the visual processing apparatus 1 executes visual processing that has been adjusted so that the effect of visual processing is altered according to the synthesized signal MUS.

Next, the visual processing apparatus 1 determines whether or not there are pixels to process next (S108). If there are no more pixels that require processing, then visual processing is completed. On the other hand, if there are further pixels that require processing, then the procedure is returned to step S101 and the next image (pixel) is input. Thereafter, the steps from S101 to S108 are repeated until there are no longer any pixels that require processing.

Thus, with the visual processing apparatus 1 of the first embodiment of the invention, it is possible to achieve visual processing that allows the side effect to be reduced only near edges, and which has an excellent visual processing effect for natural images.

It should be noted that although the visual processing apparatus 1 finds the degree of edge proximity from the edge amount and finds the degree of flatness from the input image signal IS, and creates the effect adjustment signal MOD based on the degree of edge proximity and the degree of flatness, it is also possible to create the effect adjustment signal MOD from the amount of change in the unsharp signal US by the spatial processing portion 10.

Below is described a method for detecting a flat region near an edge according to a modified example of the control signal generation portion 40.

Figure 7A:
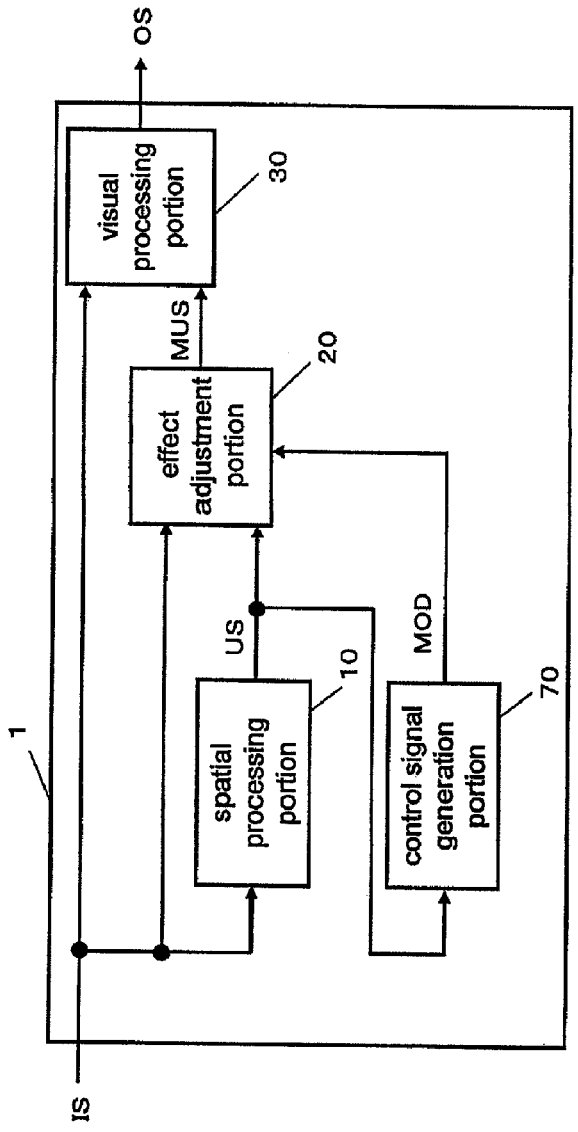
FIGS. 7A and 7B show the configuration of the control signal generation portion of a modified example of the same.
Figure 7B:
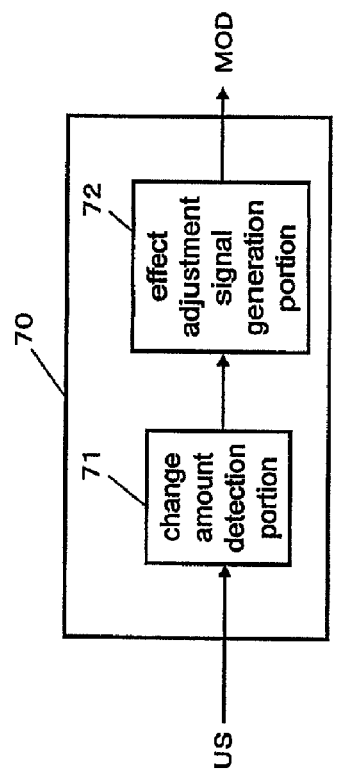

An implementation in which the effect adjustment signal MOD is created from the amount of change in the unsharp signal US is described using FIGS. 7(a), 7(b) and 14(a)-14(d). FIG. 7(a) is a block diagram showing the configuration of the visual processing apparatus 1 according to this modified example of the embodiment. That is, it shows a modified example of the visual processing apparatus 1 that is shown in FIG. 1. This visual processing apparatus differs from the visual processing apparatus 1 of FIG. 1 in that the input of a control signal generation portion 70 (a modified example of the control signal generation portion 40) is not the input signal IS but rather an unsharp signal US signal. FIG. 7(b) is a block diagram that shows the configuration of the control signal generation portion 70, which is a modified example of the control signal generation portion 40.

As shown in FIG. 7(b), the control signal generation portion 70 is provided with a change amount detection portion 71 for detecting the amount of change in the unsharp signal US, and an effect adjustment signal generation portion 72 for outputting an effect adjustment signal MOD in accordance with the amount of change that has been detected.

The unsharp signal US is obtained by cutting out (reducing) the high-frequency signal component of a natural image, but leaves steep edge components. Thus, by extracting regions near an edge based on edge components that remain in the unsharp signal US, it is possible to approximately detect flat portions near edges.

In this embodiment, the input of the control signal generation portion 70 is set as the unsharp signal US, and flat sections near edges are detected by calculating the amount of change in that signal. Thus, in the flatness detection, in which it is preferable that a large area (image region) is referenced, it is possible to reduce the image region that is referenced and thus reduce the amount of processing required to detect a flat section.

The change amount detection portion 71 performs this detection using an edge detection filter (not shown) such as a first derivative filter like a Sobel filter or a Prewitt filter or a second derivative filter like a Laplacian filter.

This may be combined with a low-pass filter or a MAX filter in order to adjust the width of the regions near an edge.

For example, when an image signal IS like that in FIG. 14(a) has been input, resulting in an unsharp signal such as that shown in FIG. 14(b), the change amount detection portion 71 outputs a large signal near an edge where the unsharp signal US changes, as in FIG. 14(c). Here, the vertical axis in FIG. 14(a) is the value of the image signal IS, and the horizontal axis is the pixel position being processed. The vertical axis in FIG. 14(b) is the value of the unsharp signal US, and the horizontal axis is the pixel position being processed. The vertical axis in FIG. 14(c) is the value of the amount of change in the unsharp signal US, and the horizontal axis is the pixel position being processed.

The effect adjustment signal generation portion 72 adjusts the output according to the amount of change that has been detected by the change amount detection portion 71. That is, the effect adjustment signal generation portion 72 outputs an effect adjustment signal MOD with a smaller signal level (value) the greater the amount of this change. For example, as shown in FIG. 8, the signal level of the effect adjustment signal MOD is changed when the amount of change that is detected is equal to or greater than a predetermined value Tha, and the signal level of the effect adjustment signal MOD is reduced in the range up to a predetermined value Thb. The signal level of the effect adjustment signal MOD is not changed beyond the predetermined threshold Thb. Thus, the signal level of the effect adjustment signal MOD can be changed when a steep edge region has been input, without affecting edge components ordinarily present in natural images. Here, the horizontal axis is the amount of change, and the vertical axis is the output (signal level) of the effect adjustment signal MOD. It should be noted the signal level of the effect adjustment signal MOD that is output is output within a range of 0.0 to 1.0, but this may also be adjusted from 0.2 to 1.0, for instance, depending on the strength of the visual processing. Further, the visual processing apparatus 1 is designed such that the effect of its visual processing becomes stronger the larger the signal level of the effect adjustment signal MOD.

Figure 14:
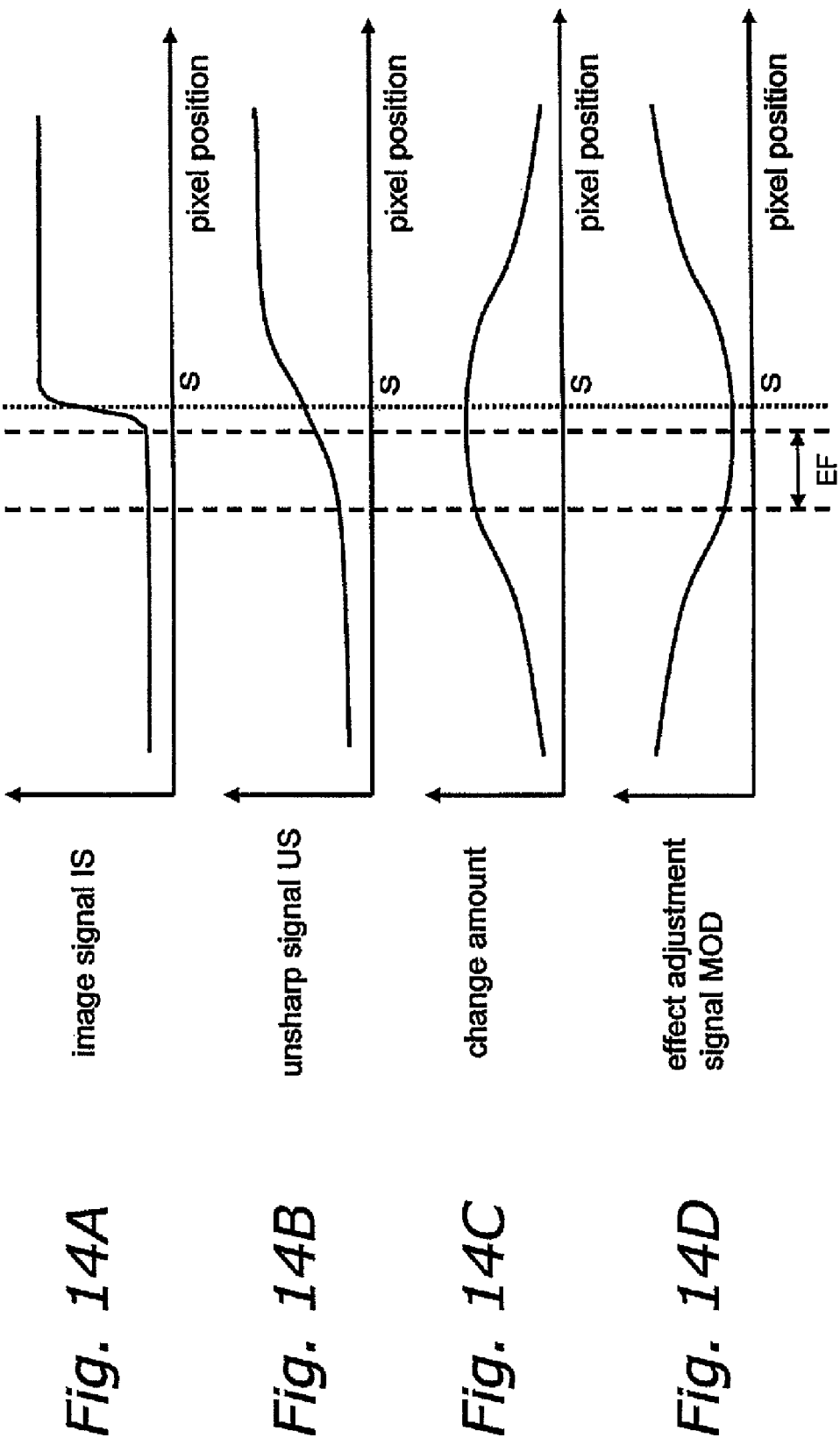
FIGS. 14A-14D describe the output of the effect adjustment signal of the visual processing apparatus according to the first embodiment of the invention.

As shown in FIG. 14(*d*), the effect adjustment signal generation portion 72 performs an output that weakens the visual effect in the flat region EF near the edge, and for regions away from the region near the edge creates an output for enhancing the visual effect. Using the effect adjustment signal MOD that is created by the effect adjustment signal generation portion 72, it is possible to achieve a visual processing apparatus 1 in which processing that weakens the visual effect is carried out in the flat regions EF near the edge and processing that enhances the visual effect is carried out in regions that are away from regions near an edge. It should be noted that the vertical axis in FIG. 14(*d*) is the value of the effect adjustment signal MOD and the horizontal axis is the pixel position that is being processed.

As illustrated above, with the control signal generation portion 70 it is possible to detect a flat region near an edge and then create an effect adjustment signal MOD, from the amount of change in the unsharp signal US.

It should be noted that it is also possible for flat regions near edges to be detected from a reduced image such as a thumbnail image in which the image signal has been reduced, and then output an effect adjustment signal MOD based on the degree of flatness near the edge or the amount of change in the unsharp signal US.

It is also possible to provide a reducing portion (not shown), for reducing the image signal, at a stage between the image signal and the control signal generation portion 40, and then from the reduced image that is produced by the reducing portion, output an effect adjustment signal MOD based on the degree of flatness near the edge or the amount of change in the unsharp signal US.

By using a reduced image, it is possible to detect flat regions that are near edges while suppressing the effects of noise. In other words, there is less noise component in a reduced image that has been created by a reduction method in which an image signal is first averaged and then decimated, and thus by using a reduced image, it is possible to detect a flat region near an edge while suppressing the effects of noise. Further, using reduced signal allows the number of pixels to be detected to be reduced, and this allows the number of calculations to be reduced.

It is also possible to furnish a low-pass filter, for instance, before the control signal generation portion 40 or the control signal generation portion 70, to limit the band of the image signal, and then detect flat regions near edges. By doing this, it is possible to reduce the noise component, and flat regions near edges can be detected while suppressing the effects of noise.

Second Embodiment

Figure 9:
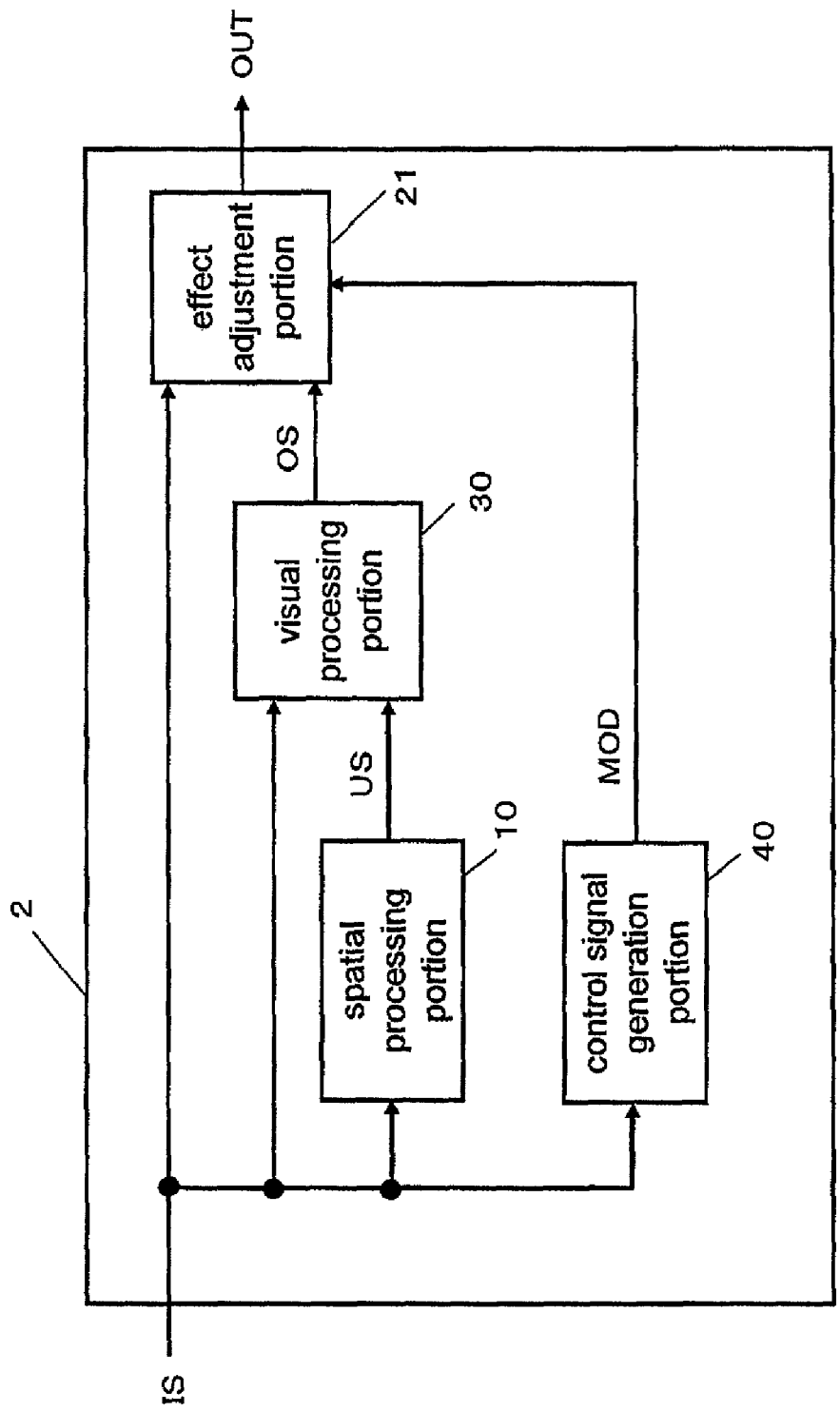
FIG. 9 is a block diagram that shows the configuration of a visual processing apparatus according to a second embodiment of the invention.

In the first embodiment of the invention, a synthesized signal MUS that is synthesized with different ratios of the image signal IS and surrounding image information (unsharp signal) US according to an effect adjustment signal MOD is output, and the visual processing portion 30 outputs a processed signal OS that is obtained by visually processing the image signal IS according to the synthesized signal MUS from the effect adjustment portion 20, but in the second embodiment of the invention, an effect adjustment portion 21 outputs a processed signal OS that is obtained by synthesizing a processed signal OS that has been visually processed and the image signal IS according to an effect adjustment signal, and this embodiment is described using FIG. 9.

FIG. 9 is a block diagram that shows the configuration of a visual processing apparatus 2 according to the second embodiment of the invention. Hereinafter, sections that are identical to those of the first embodiment are assigned the same reference numerals as before and will not be described in detail.

In FIG. 9, the visual processing portion 30 outputs a processed signal OS based on the image signal IS and the output US of the spatial processing portion 10.

The effect adjustment portion 21 interpolates the image signal IS and the processed signal OS in accordance with the effect adjustment signal MOD in order to differ (change) the effect of visual processing. For example, the output OUT from the effect adjustment portion 21 is calculated by interpolation computation like in Eq. 3 below.

$$OUT = OS \times MOD + IS \times (1.0 - MOD) \qquad \text{Eq. 3}$$

It should be noted that Eq. 3 can be modified as shown in Eq. 4.

$$OUT = (OS - IS) \times MOD + IS \qquad \text{Eq. 4}$$

Thus, according to the second embodiment of the invention, it is possible to output a synthesized signal OUT that is synthesized varying the ratio of the processed signal OS and the image signal IS according to the effect adjustment signal MOD, so as to differ (change) the effect of visual processing.

It should be noted that it is also possible to substitute the control signal generation portion 70 of the first embodiment of the invention for the control signal generation portion 40. In this case as well, regions near an edge can be similarly detected and an effect adjustment signal MOD that corresponds to the amount of change in the surrounding information near the edge can be created.

Third Embodiment

Figure 10:
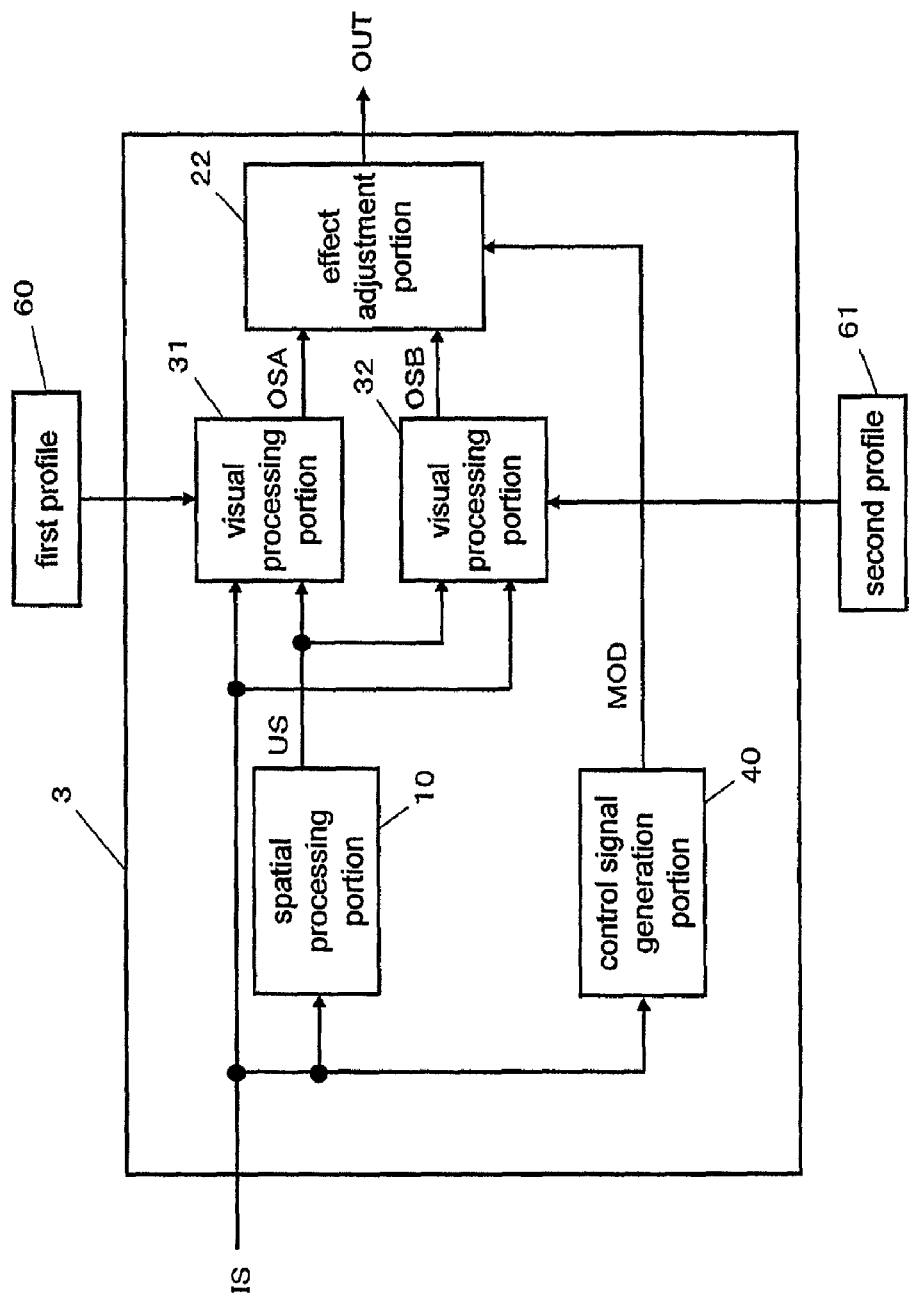
FIG. 10 is a block diagram that shows the configuration of a visual processing apparatus according to a third embodiment of the invention.

In the first embodiment of the invention, a synthesized signal MUS that is synthesized changing the ratio of the image signal IS and the surrounding image information US according to an effect adjustment signal MOD is output, and the visual processing portion 30 outputs a processed signal OS that is obtained by visually processing the image signal according to the synthesized signal MUS from the effect adjustment portion 20, but in the third embodiment of the invention, an effect adjustment portion 22 outputs a processed signal OS that is synthesized changing the ratio of the outputs of a visual processing portion 31 and a visual processing portion 32, whose visual processing effects are different, in accordance with the effect adjustment signal MOD, and this embodiment is described using FIG. 10.

FIG. 10 is a block diagram that shows the configuration of a visual processing apparatus 3 according to the third embodiment of the invention. Hereinafter, sections that are identical to those of the first embodiment are assigned the same reference numerals as before and will not be described in detail.

The effect adjustment portion 22 synthesizes an output OSA of the visual processing portion 31 in which a first profile 60 has been set in the LUT and an output OSB of the visual processing portion 32 in which a second profile 61 has been set in the LUT, whose strength of visual processing is different, by interpolation computation according to the effect adjustment signal MOD that is output from the control signal generation portion 40, and outputs a processed signal OS. It should be noted that it is also possible to create a synthesized output by extrapolation computation. At this time, the processed signal OS is as shown in Eq. 5.

$$OS = OSA \times MOD + OSB \times (1.0 - MOD) \qquad \text{Eq. 5}$$

It should be noted that Eq. 5 can be modified as in Eq. 6.

$$OS = (OSA - OSB) \times MOD + OSB \qquad \text{Eq. 6}$$

Thus, with the third embodiment of the invention, by obtaining a synthesized output that is synthesized varying the ratio of the outputs of the visual processing portion 31 and the visual processing portion 32, whose visual processing effects are different, in accordance with the effect adjustment signal MOD, it is possible to perform visual processing with differing degrees of visual effect.

It should be noted that it is also possible to substitute the control signal generation portion 70 of the first embodiment of the invention for the control signal generation portion 40. In this case as well, regions near an edge can be similarly detected and an effect adjustment signal MOD that corresponds to the amount of change in the surrounding information near the edge can be created.

Fourth Embodiment

Figure 11:
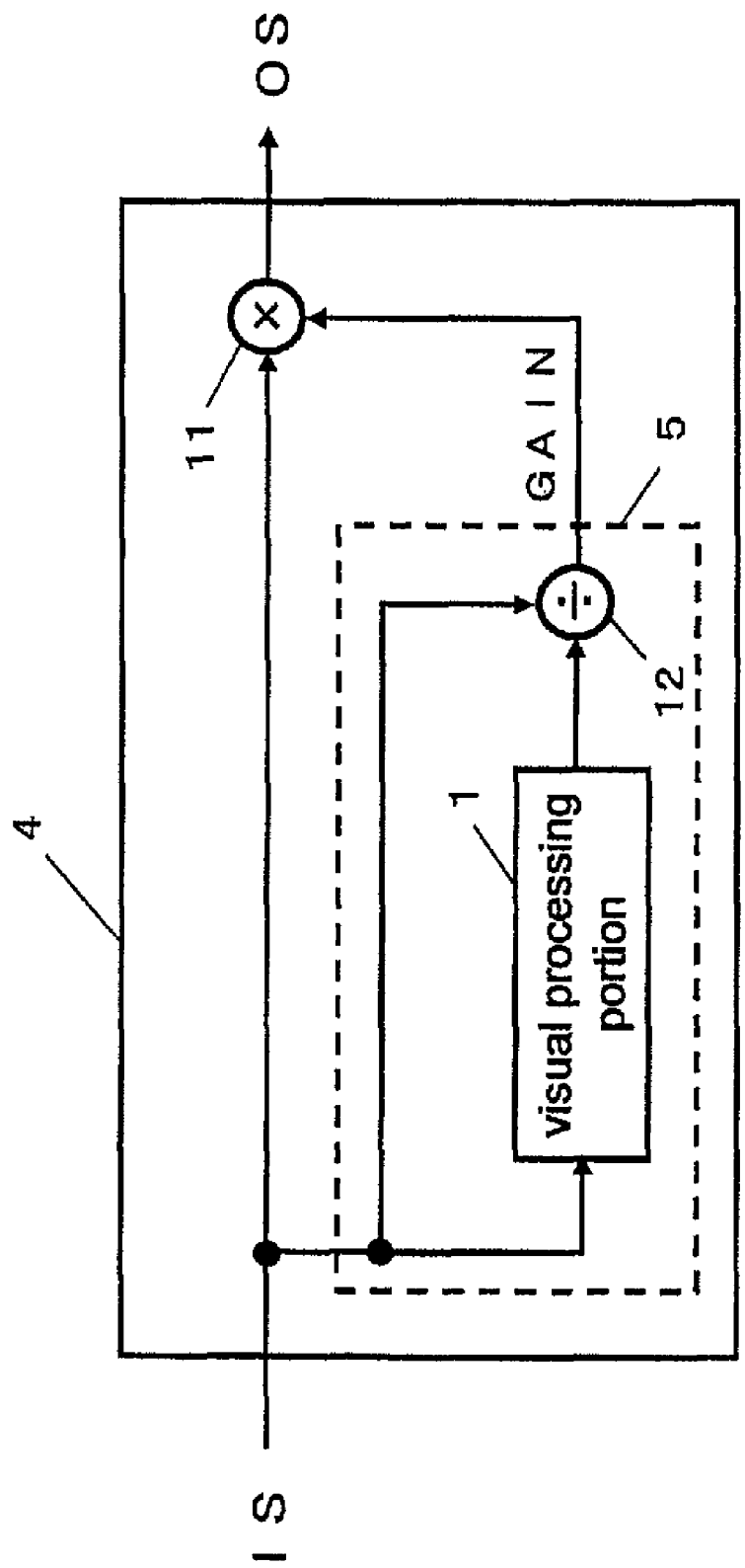
FIG. 11 is a block diagram that shows the configuration of a visual processing system according to a fourth embodiment of the invention.
Figure 12:
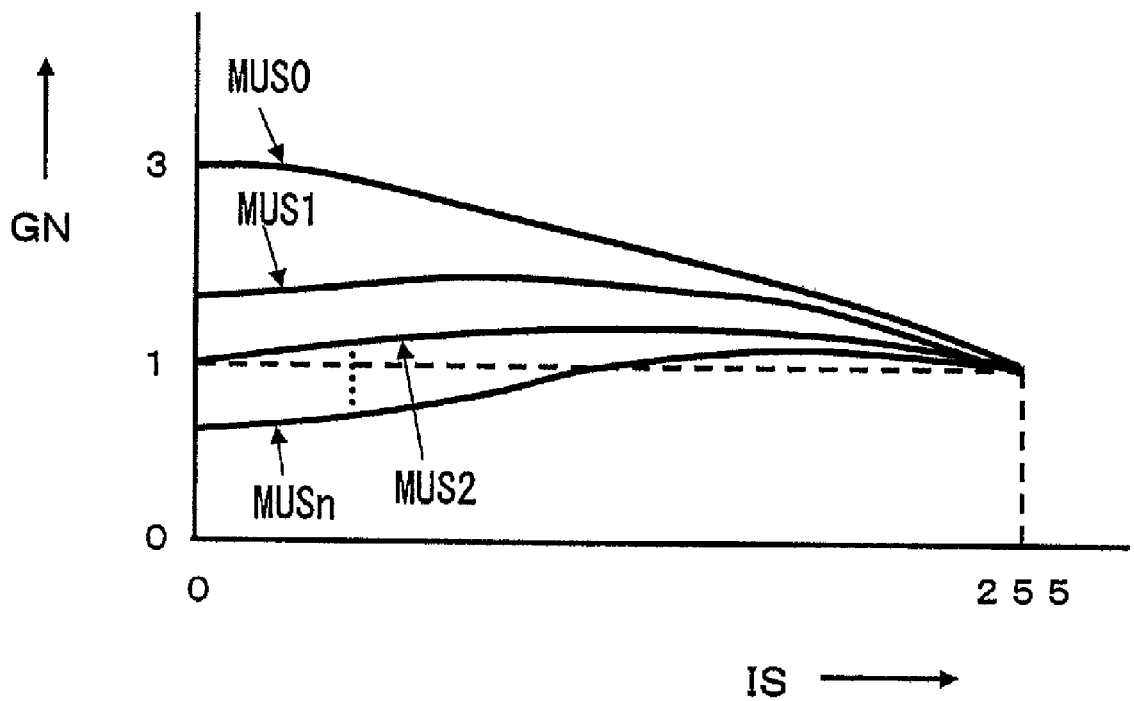
FIG. 12 is an explanatory diagram for describing the two-dimensional gain characteristics of the same.

In the visual processing apparatuses of the first embodiment of the invention through the third embodiment of the invention, a grayscale conversion value that is based on the two-dimensional grayscale conversion characteristics is output, but the fourth embodiment of the invention describes a case in which grayscale conversion is performed using a gain signal using FIGS. 11 and 12.

FIG. 11 is a block diagram that shows the configuration of a gain-type visual processing system 4 according to the fourth embodiment of the invention, and FIG. 12 is an explanatory diagram for describing the two-dimensional gain characteristics. Hereinafter, sections that are identical to those of the first embodiment are assigned the same reference numerals as before and are not described in detail.

In FIG. 11, the gain-type visual processing system 4 is provided with a gain-type visual processing apparatus 5 for outputting a gain signal GAIN that is obtained by visually processing the image signal IS, and a multiplier 11 for multiplying the gain signal GAIN and the image signal IS.

The gain-type visual processing apparatus 5 is provided with the visual processing apparatus 1 for outputting a processing signal OS that is obtained by visually processing the image signal IS, and a divider 12 for dividing the processed signal OS by the image signal IS. Here, the visual processing apparatus 1 outputs a grayscale conversion value that is obtained by visually processing the output of the image signal IS, and the gain-type visual processing apparatus 5 can be achieved by dividing this grayscale conversion value by the image signal IS.

The multiplier 11 multiplies the image signal IS and the gain signal GAIN that is output by the gain-type visual processing apparatus 5, and outputs a grayscale conversion value that is produced by visually processing the output of the image signal IS.

It should be noted that it is also possible for the visual processing portion 30 to carry out processing by directly using a profile that has the two-dimensional gain characteristics shown in FIG. 12. Here, the vertical axis of FIG. 12 is the gain output GN, and the horizontal axis is the image signal IS. The two-dimensional gain characteristics shown in FIG. 12 are equivalent to those that are obtained by dividing the output of the profile of the two-dimensional grayscale characteristics shown in FIG. 2 with the image signal IS. It is also possible to set a profile that has these two-dimensional gain characteristics in the LUT of the visual processing portion 30 of the visual processing apparatus 1. If a profile of the two-dimensional gain characteristics is set in the LUT of the visual processing portion 30 in advance, then the gain signal GN and the gain signal GAIN become equal, and thus it is possible to achieve the gain-type visual processing apparatus 5 without the divider 12.

With the gain-type visual processing apparatus 5, there is little change in the processed signal with respect to the change in the input image signal IS, and thus it is possible to reduce the bit number of the input signal and also to reduce the circuit scale. Additionally, if the visual processing portion 30 is provided with a 2D LUT, then it is possible to reduce the memory capacity.

Thus, with the gain-type visual processing system 4 of the fourth embodiment of the invention, saturation of the grayscale can be suppressed easily and excellent visual processing can be achieved by controlling the gain signal GAIN.

It should be noted that the visual processing apparatus 1 of the first embodiment of the invention can be replaced with the visual processing apparatus 2 of the second embodiment of the invention. In this case as well, the gain-type visual processing apparatus 5 can be similarly achieved.

The visual processing apparatus 1 of the first embodiment of the invention can be replaced with the visual processing apparatus 3 of the third embodiment of the invention. The gain-type visual processing apparatus 5 can be similarly achieved in this case as well.

Thus, according to the first embodiment of the invention through the fourth embodiment of the invention, it is possible to realize visual processing in which side effects are suppressed, even when an image with steep edge regions has been input.

It should be noted that the visual processing apparatus described in this embodiment can be provided in or connected to a device for handling moving images, and may create an effect adjustment signal MOD from the image of each frame or each field. The control signal generation portion 40 can extract edge information or flatness information from a frame image at least one (frame) prior when the image signal is a frame image, or from a field image at least one (field) prior when the image signal is a field image. By doing this, the visual processing apparatus can use an effect adjustment signal MOD that corresponds to the edge information or the flatness information from the top of the frame. It is also possible for the visual processing apparatus to extract edge information or flatness information from a field image at least one (field) prior, and use an effect adjustment signal MOD that corresponds to the edge information or the flatness information from the top of the field image. It is also possible for the control signal generation portion 40 to extract edge information or flatness information from a frame image at least one (frame) prior or from a field image at least one (field) prior, and by doing so it becomes easy to coordinate the delay of the circuit and the circuit scale can be reduced.

It should be noted that the various functions, such as the spatial processing function, the effect adjustment function, and the visual processing function, of the visual processing apparatuses or visual processing system of the first embodiment of the invention through the fourth embodiment of the invention can be achieved by hardware that uses an integrated circuit, for example, or may also be implemented by software that operates using a central processing unit (CPU) or a digital signal processing apparatus or the like.

First, if the various functions are implemented by hardware, then the various functions of the embodiments of the invention can be provided on separate integrated circuits, or alternatively some or all of these may be integrated into a single chip.

The integrated circuit may be realized by a dedicated circuit or a general purpose processor. For example, after processing the semiconductor chip, it is possible to employ a programmable FPGA (Field Programmable Gate Array) or a reconfigurable processor in which the connections and settings of the cells within the integrated circuit can be reconfigured.

Further, if other technologies that improve upon or are derived from semiconductor technologies introduce integration technology that supplants integrated circuit technology, then naturally it is also possible to integrate the functional blocks using that technology. Advances in biotechnology may lead to bio-computer applications.

Figure 15:
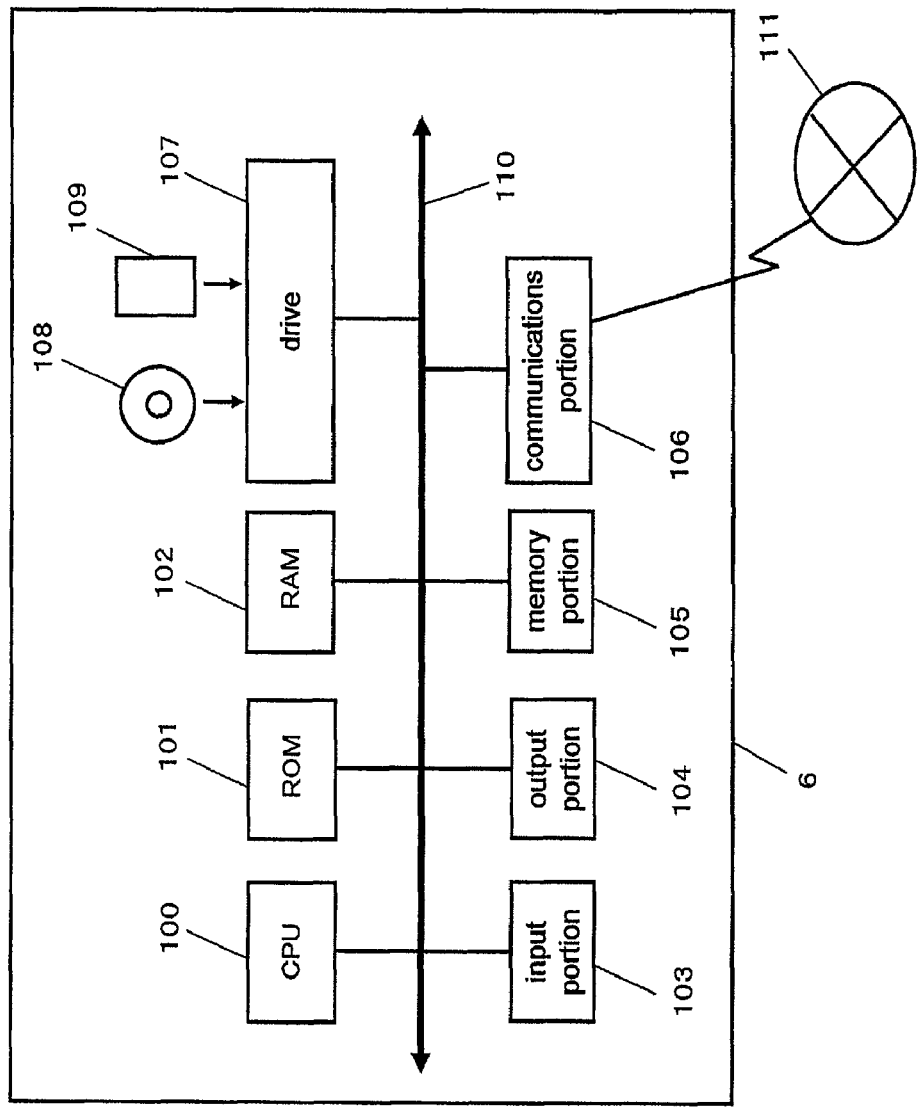
FIG. 15 is a block diagram that shows the configuration of a computer according to an embodiment of the invention.
Figure 16:
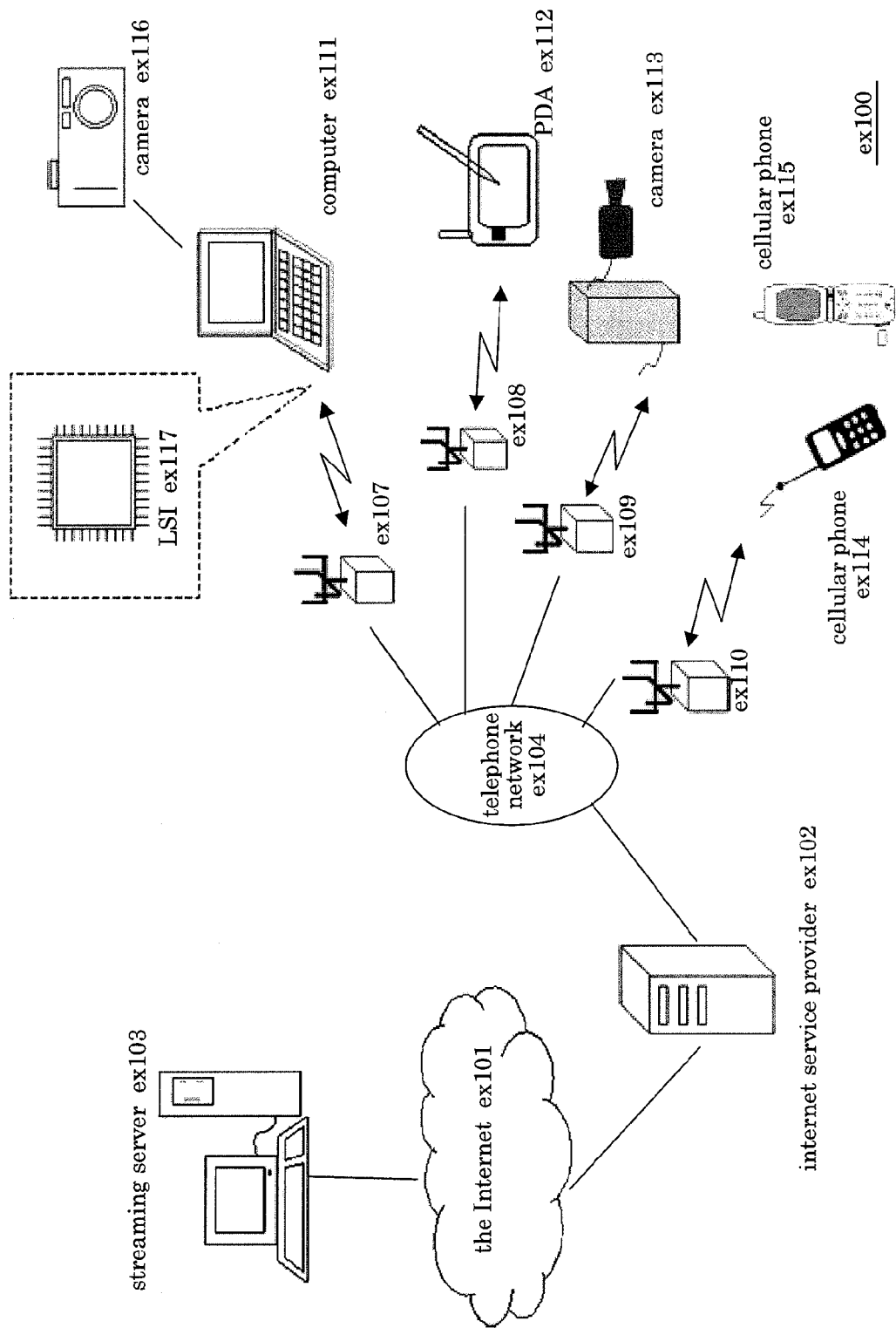
FIG. 16 is a diagram of the overall configuration of the content supply system according to the fifth embodiment of the invention.
Figure 17:
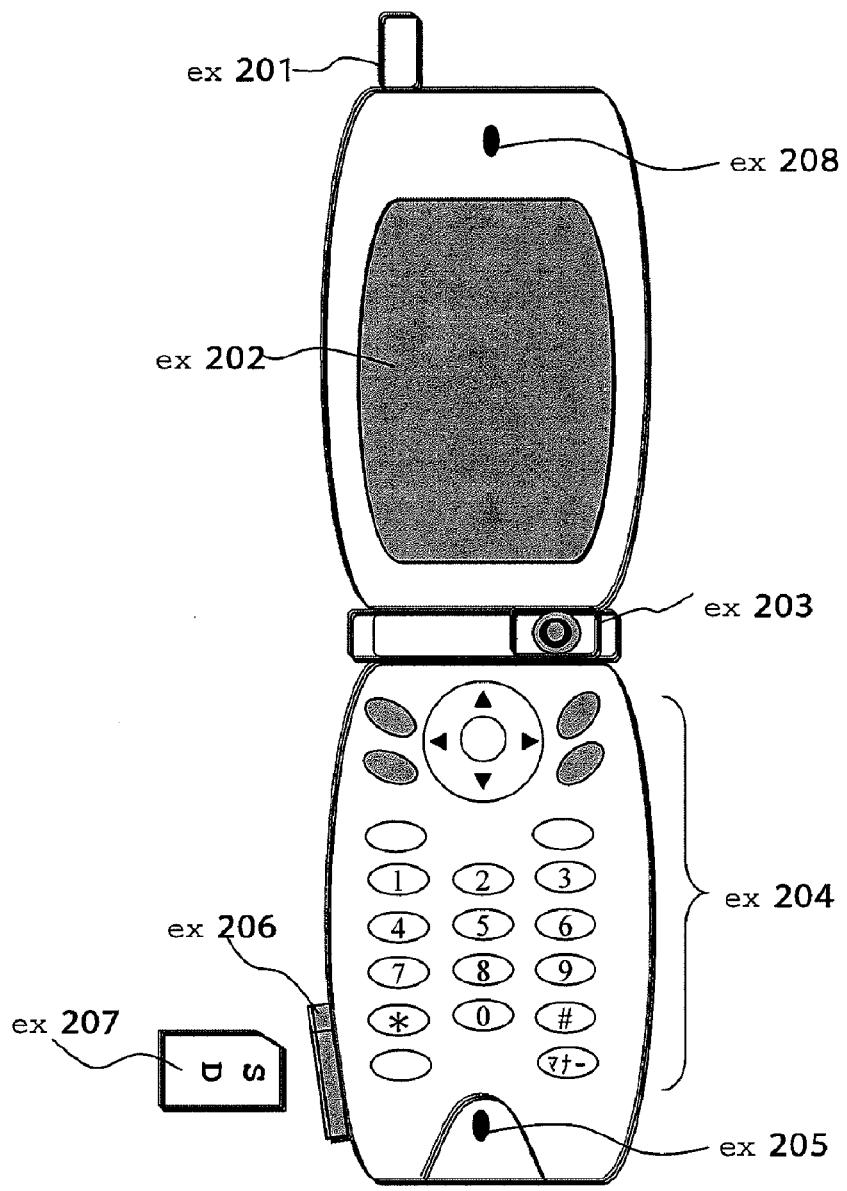
FIG. 17 is a front view of a portable telephone that is provided with the visual processing apparatus according to the fifth embodiment.
Figure 18:
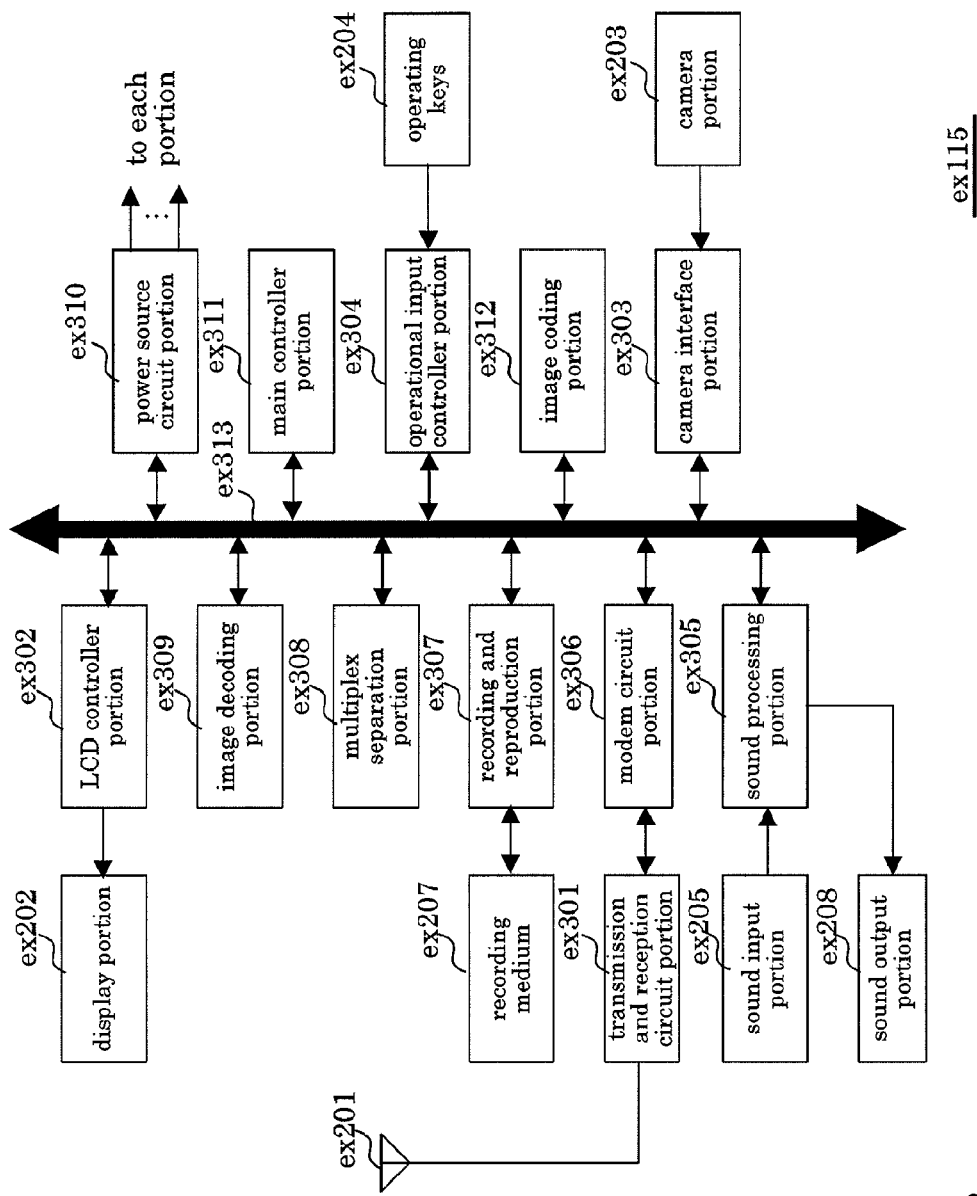
FIG. 18 is a block diagram for describing the overall configuration of the portable telephone according to the fifth embodiment.
Figure 19:
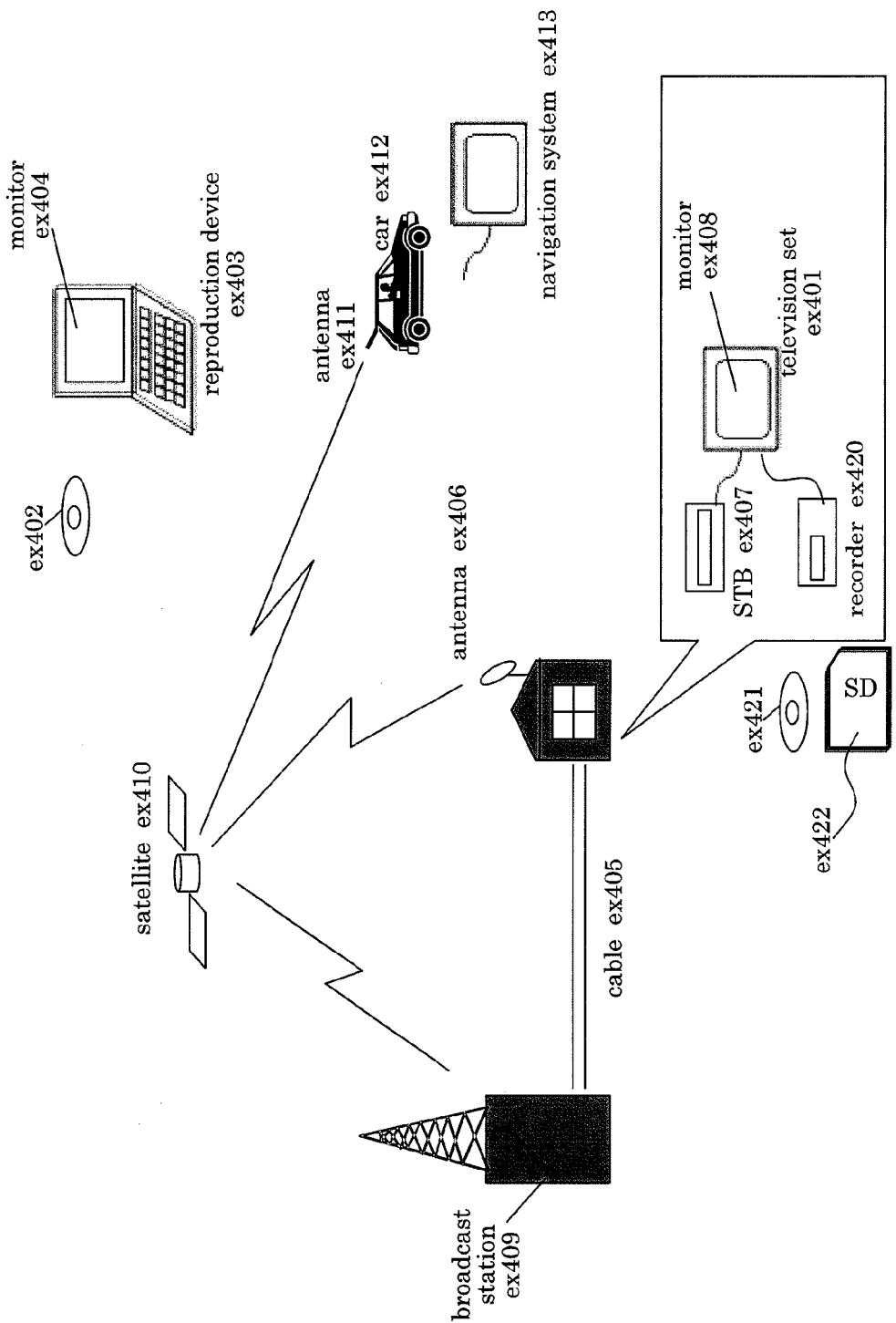
FIG. 19 is an explanatory diagram of the overall configuration of the digital broadcast system according to the fifth embodiment.

Next, a case in which the various functions are realized by software is described using FIG. 15. FIG. 15 is a block diagram showing the configuration of a computer according to an embodiment of the invention.

In FIG. 15, a computer 6 is provided with a CPU 100 that executes the commands of the various programs, a read-only memory 101 in which the programs are stored (hereinafter, referred to as "ROM 101"), a random-access memory 102 for holding temporarily stored data (hereafter, referred to as "RAM 102"), an input portion 103 for inputting an image, an output portion 104 for outputting an image, and a memory portion 105 for storing programs and various types of data.

It can also be provided with a communications portion 106 for communicating with the outside, and a drive 107 for appropriately connecting to an information storage medium.

The various functional portions send and receive control signals and data, for example, over a bus 110.

The CPU 100 executes the processing of the various functions in accordance with programs that are stored in the ROM 101.

The ROM 101 stores programs and profiles, for example.

The RAM 102 temporarily stores the data necessary for the processing of the various functions by the CPU 100.

The input portion 103 inputs images. For example, it receives electromagnetic waves and decodes the received signal that is received to produce a video signal. It may also obtain digital images directly via a land line.

The output portion 104 outputs images. For example, it outputs to a display device such as a liquid crystal display device or a plasma display device.

The memory portion 105 is made from a magnetic memory or the like, and stores various programs and data.

The communications portion 106 is connected to a network 111, and via the network 111 it obtains programs and, as necessary, installs the programs that it has obtained onto the memory portion 105. Thus, the computer 6 can download programs through the communications portion 106.

The drive 107 appropriately connects with an information storage medium, and obtains storage information that is stored on the information storage medium. The information storage medium is a disk 108 such as a magnetic disk, magneto-optical disk, or optical disk, or a memory card 109 such as a semiconductor memory.

It should be noted that it is also possible to store the profiles or program for executing the various functions on the disk 108 or a memory card 109 such as a semiconductor memory, and to provide that information to the computer 6. It is also possible to provide the program to the computer in advance bundled with dedicated hardware, or for the program to be bundled in the ROM 101 or the storage portion 105 in advance.

The program can be adopted by devices that handle images, such as information processing devices, televisions, digital cameras, portable telephones, and PDAs. The program can be installed in or connected to a device that handles images, and executes visual processing in which side effects are suppressed in flat regions that are near edges.

It should be noted that the visual processing apparatus can be provided in or connected to a device for handling moving images, and may create an effect adjustment signal MOD from the image of each frame or each field. The control signal generation portion 40 can extract edge information or flatness information from a frame image at least one (frame) prior when the image signal is a frame image, or from a field image at least one (field) prior when the image signal is a field image. By doing this, the visual processing apparatus can use an effect adjustment signal MOD that corresponds to the edge information or the flatness information from the top of the frame. It is also possible for the visual processing apparatus 1 to extract edge information or flatness information from a field image at least one (field) prior, so as to use an effect adjustment signal MOD that corresponds to the edge information or the flatness information from the top of the field image. It is also possible for the control signal generation portion 40 to extract edge information or flatness information from a frame image at least one (frame) prior or from a field image at least one (field) prior, and by doing so it becomes easy to coordinate the delay of the circuit and the circuit scale can be reduced.

With the visual processing apparatus, visual processing method, program, recording medium, display device, and integrated circuit according to the invention, it is possible to visually process the image signal, and in particular, it is possible to inhibit side effects even when an image that has sharp edge regions has been input, and thus these are usefully in fields relating to video and image processing, and the visual processing apparatus, visual processing method, program, recording medium, display device, and integrated circuit according to the invention can be implemented in these fields.

The invention claimed is:

1. A visual processing device, comprising:
    a spatial processing portion operable to output a processed signal generated by performing predetermined spatial processing on an input image signal based on information from a plurality of pixels surrounding a target pixel of the input image signal; and
    a visual processing portion operable to perform visual processing using the input image signal and the processed signal, and operable to output an output signal as a result of the visual processing, the visual processing being performed using the input image signal and the processed signal output by the spatial processing portion, so as to enhance a local contrast of the input image signal, wherein the visual processing portion reduces an effect of the enhancement of the local contrast with respect to a flat region in the input image signal, the flat region being proximal to a detected edge of the input image signal and determined based on a range of the plurality of pixels surrounding the target pixel.

2. The visual processing device according to claim 1, wherein the flat region, which is proximal to the detected edge and determined based on the range of the plurality of pixels surrounding the target pixel, is determined by detecting an edge of an unsharp signal of the input image signal.

3. The visual processing device according to claim 2, wherein the unsharp signal is the processed signal output by the spatial processing portion.

4. An image display device, comprising:
the visual processing device according to claim 1; and
a display portion operable to display the output signal output by the visual processing portion.

5. A television device comprising:
a reception portion operable to receive a video signal;
a decoding portion operable to decode the video signal and output an image signal;
a spatial processing portion operable to output a processed signal generated by performing predetermined spatial processing on the image signal based on information from a plurality of pixels surrounding a target pixel of the image signal;
a visual processing portion operable to perform visual processing using the image signal and the processed signal, and operable to output an output signal as a result of the visual processing, the visual processing being performed using the image signal and the processed signal output by the spatial processing portion, so as to enhance a local contrast of the image signal; and
a display portion operable to display the output signal output by the visual processing portion,
wherein the visual processing portion reduces an effect of the enhancement of the local contrast with respect to a flat region in the image signal, the flat region being proximal to a detected edge of the image signal and determined based on a range of the plurality of pixels surrounding the target pixel.

6. A portable information terminal device, comprising:
a reception portion operable to receive a video signal;
a decoding portion operable to decode the video signal and output an image signal;
a spatial processing portion operable to output a processed signal generated by performing predetermined spatial processing on the image signal based on information from a plurality of pixels surrounding a target pixel of the image signal;
a visual processing portion operable to perform visual processing using the image signal and the processed signal, and operable to output an output signal as a result of the visual processing, the visual processing being performed using the image signal and the processed signal output by the spatial processing portion, so as to enhance a local contrast of the image signal; and
a display portion operable to display the output signal output by the visual processing portion,
wherein the visual processing portion reduces an effect of the enhancement of the local contrast with respect to a flat region in the image signal, the flat region being proximal to a detected edge of the image signal and determined based on a range of the plurality of pixels surrounding the target pixel.

7. A camera, comprising:
an imaging portion operable to capture an image and generate an image signal;
a spatial processing portion operable to output a processed signal generated by performing predetermined spatial processing on the image signal based on information from a plurality of pixels surrounding a target pixel of the image signal;
a visual processing portion operable to perform visual processing using the image signal and the processed signal, and operable to output an output signal as a result of the visual processing, the visual processing being performed using the image signal and the processed signal output by the spatial processing portion, so as to enhance a local contrast of the image signal; and
a display portion operable to display the output signal output by the visual processing portion,
wherein the visual processing portion reduces an effect of the enhancement of the local contrast with respect to a flat region in the image signal, the flat region being proximal to a detected edge of the image signal and determined based on a range of the plurality of pixels surrounding the target pixel.

8. A visual processing method, comprising:
a spatial processing step of outputting a processed signal generated by performing predetermined spatial processing on an input image signal based on information from a plurality of pixels surrounding a target pixel of the input image signal; and
a visual processing step of performing visual processing using the input image signal and the processed signal, and outputting an output signal as a result of the visual processing, the visual processing being performed using the input image signal and the processed signal output by the spatial processing step, so as to enhance local contrast of the input image signal,
wherein the visual processing step includes reducing an effect of the enhancement of the local contrast with respect to a flat region in the input image signal, the flat region being proximal to a detected edge of the input image signal and determined based on a range of the plurality of pixels surrounding the target pixel.

9. An integrated circuit executing the visual processing method according to claim 8.

10. A non-transitory computer-readable storage medium storing an image processing program causing a computer to execute the visual processing method according to claim 8.

* * * * *